US012693764B2

(12) United States Patent
Parker et al.

(10) Patent No.: US 12,693,764 B2
(45) Date of Patent: Jul. 28, 2026

(54) SYSTEMS AND METHODS FOR AUTOMATED INTERACTION WITH A TOUCH-SCREEN DEVICE

(71) Applicant: Jackpocket LLC, Boston, MA (US)

(72) Inventors: Eric Parker, Brooklyn, NY (US); Peter J. Sullivan, Santa Barbara, CA (US); Elias Bachaalany, Jbeil (LB); Imad Maalouf, Beirut (LB); James Mansour, Austin, TX (US); Redza Shah, Austin, TX (US)

(73) Assignee: Jackpocket LLC, New York, NY (US)

( * ) Notice: Subject to any disclaimer, the term of this patent is extended or adjusted under 35 U.S.C. 154(b) by 0 days.

(21) Appl. No.: 19/279,198

(22) Filed: Jul. 24, 2025

(65) Prior Publication Data

US 2025/0348172 A1 Nov. 13, 2025

Related U.S. Application Data

(63) Continuation of application No. 19/173,400, filed on Apr. 8, 2025, now Pat. No. 12,393,308, which is a continuation of application No. 18/947,997, filed on Nov. 14, 2024, which is a continuation of application No. 18/323,624, filed on May 25, 2023, now Pat. No. 12,182,364, which is a continuation of application No. 18/055,517, filed on Nov. 15, 2022, now Pat. No. 11,698,700.

(51) Int. Cl.
*G06F 3/042* (2006.01)

(52) U.S. Cl.
CPC .................................. *G06F 3/0421* (2013.01)

(58) Field of Classification Search
None
See application file for complete search history.

(56) References Cited

U.S. PATENT DOCUMENTS

| | | | |
|---|---|---|---|
| 6,003,008 A | 12/1999 | Postrel et al. | |
| 6,864,878 B2 | 3/2005 | Stohrer et al. | |
| 8,994,666 B2 * | 3/2015 | Karpfinger ............ | G06F 3/0488 |
| | | | 345/173 |
| 10,324,566 B2 * | 6/2019 | Christiansson ....... | G06F 3/0428 |
| 2003/0184574 A1 | 10/2003 | Phillips et al. | |
| 2007/0024593 A1 | 2/2007 | Schroeder | |
| 2012/0262408 A1 * | 10/2012 | Pasquero .............. | G06F 3/0421 |
| | | | 345/174 |

(Continued)

*Primary Examiner* — Ronald Laneau

(74) *Attorney, Agent, or Firm* — Bookoff McAndrews, PLLC

(57) ABSTRACT

Systems and methods for automated interaction with a touch-screen device are described. A system for automated interaction with a touch-screen device may include at least one optical sensor configured to sense at least a first portion of a touch-screen of the touch-screen device; at least one solenoid including an end effector that is tactilely detectable by the touch-screen, wherein operation of the at least one solenoid causes the end effector to tactilely engage with a second portion of the touch-screen; and a controller that is operatively connected to the at least one optical sensor and the at least one solenoid, and that is configured to operate the at least one solenoid in response to detecting a predetermined characteristic of the touch-screen via the at least one sensor.

20 Claims, 19 Drawing Sheets

(56) References Cited

U.S. PATENT DOCUMENTS

2013/0147721 A1* 6/2013 McGeever .......... G06F 3/03548
                                                345/173
2014/0118268 A1* 5/2014 Kuscher ............... G06F 3/0488
                                                345/173
2020/0379730 A1* 12/2020 Graham ................ G06F 3/0482
2022/0053142 A1* 2/2022 Manzari ................ H04N 23/69
2022/0294992 A1 9/2022 Manzari et al.
2023/0152959 A1 5/2023 Gray et al.
2023/0393686 A1 12/2023 Van Ostrand et al.
2025/0077068 A1 3/2025 Guo et al.
2025/0118173 A1* 4/2025 Sullivan ............... G07F 17/329

* cited by examiner

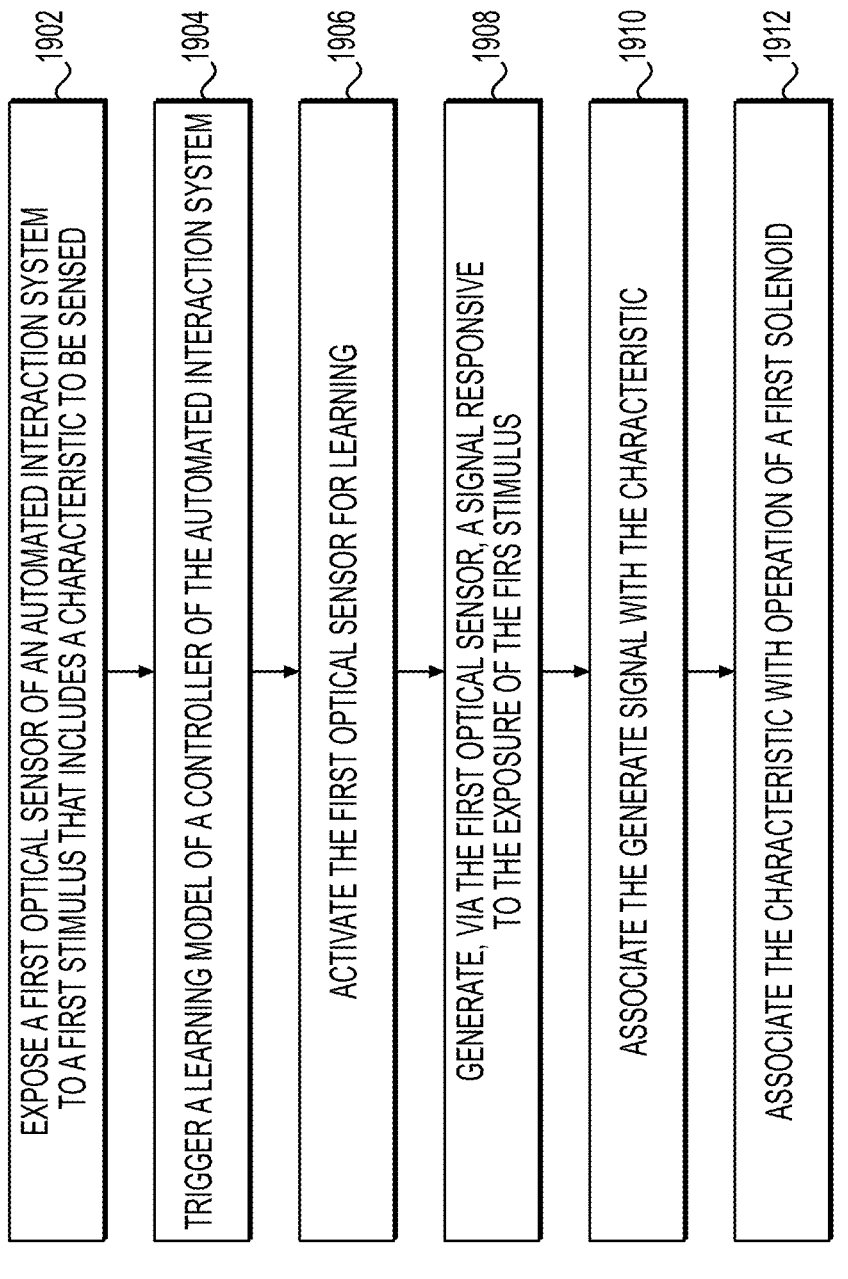

EXPOSE A FIRST OPTICAL SENSOR OF AN AUTOMATED INTERACTION SYSTEM TO A FIRST STIMULUS THAT INCLUDES A CHARACTERISTIC TO BE SENSED ⌇1902

TRIGGER A LEARNING MODEL OF A CONTROLLER OF THE AUTOMATED INTERACTION SYSTEM ⌇1904

ACTIVATE THE FIRST OPTICAL SENSOR FOR LEARNING ⌇1906

GENERATE, VIA THE FIRST OPTICAL SENSOR, A SIGNAL RESPONSIVE TO THE EXPOSURE OF THE FIRS STIMULUS ⌇1908

ASSOCIATE THE GENERATE SIGNAL WITH THE CHARACTERISTIC ⌇1910

ASSOCIATE THE CHARACTERISTIC WITH OPERATION OF A FIRST SOLENOID ⌇1912

*FIG. 19*

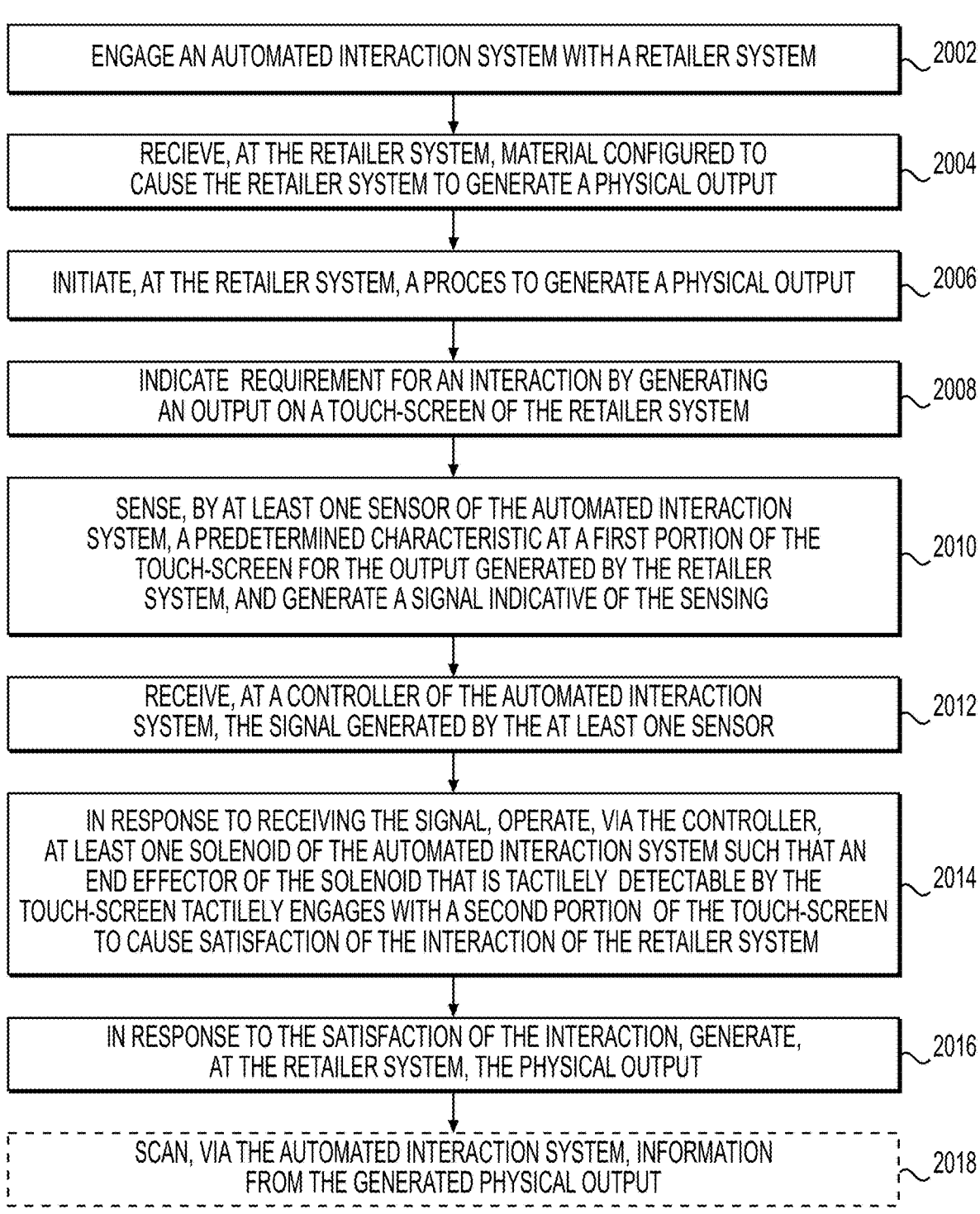

ENGAGE AN AUTOMATED INTERACTION SYSTEM WITH A RETAILER SYSTEM ⟋2002

RECIEVE, AT THE RETAILER SYSTEM, MATERIAL CONFIGURED TO CAUSE THE RETAILER SYSTEM TO GENERATE A PHYSICAL OUTPUT ⟋2004

INITIATE, AT THE RETAILER SYSTEM, A PROCES TO GENERATE A PHYSICAL OUTPUT ⟋2006

INDICATE REQUIREMENT FOR AN INTERACTION BY GENERATING AN OUTPUT ON A TOUCH-SCREEN OF THE RETAILER SYSTEM ⟋2008

SENSE, BY AT LEAST ONE SENSOR OF THE AUTOMATED INTERACTION SYSTEM, A PREDETERMINED CHARACTERISTIC AT A FIRST PORTION OF THE TOUCH-SCREEN FOR THE OUTPUT GENERATED BY THE RETAILER SYSTEM, AND GENERATE A SIGNAL INDICATIVE OF THE SENSING ⟋2010

RECEIVE, AT A CONTROLLER OF THE AUTOMATED INTERACTION SYSTEM, THE SIGNAL GENERATED BY THE AT LEAST ONE SENSOR ⟋2012

IN RESPONSE TO RECEIVING THE SIGNAL, OPERATE, VIA THE CONTROLLER, AT LEAST ONE SOLENOID OF THE AUTOMATED INTERACTION SYSTEM SUCH THAT AN END EFFECTOR OF THE SOLENOID THAT IS TACTILELY DETECTABLE BY THE TOUCH-SCREEN TACTILELY ENGAGES WITH A SECOND PORTION OF THE TOUCH-SCREEN TO CAUSE SATISFACTION OF THE INTERACTION OF THE RETAILER SYSTEM ⟋2014

IN RESPONSE TO THE SATISFACTION OF THE INTERACTION, GENERATE, AT THE RETAILER SYSTEM, THE PHYSICAL OUTPUT ⟋2016

SCAN, VIA THE AUTOMATED INTERACTION SYSTEM, INFORMATION FROM THE GENERATED PHYSICAL OUTPUT ⟋2018

*FIG. 20*

SYSTEMS AND METHODS FOR AUTOMATED INTERACTION WITH A TOUCH-SCREEN DEVICE

CROSS-REFERENCE TO RELATED APPLICATION(S)

This patent application is a continuation of and claims the benefit of priority to U.S. patent application Ser. No. 19/173,400, filed on Apr. 8, 2025, which is a continuation of and claims the benefit of priority to U.S. patent application Ser. No. 18/947,997, filed on Nov. 14, 2024, which is a continuation of and claims the benefit of priority to U.S. patent application Ser. No. 18/323,624, filed on May 25, 2023, which is now U.S. Pat. No. 12,182,364, which is a continuation of and claims the benefit of priority to U.S. patent application Ser. No. 18/055,517, filed on Nov. 15, 2022, which is now U.S. Pat. No. 11,698,700, the entireties of which are incorporated herein by reference.

TECHNICAL FIELD

Various embodiments of the present disclosure relate generally systems and methods for autonomous interactions between devices, and more particularly to systems and methods for automated interaction with a touch-screen device.

BACKGROUND

Widespread adaptation of automation technologies has improved accessibility and efficiency for many types of activities. However, automation may be impractical, impermissible, and/or impossible for at least a portion of some activities. For example, at least a portion of an activity may require receipt of an instruction or interaction via a touch-screen device. While, in some instances, it may be possible to substitute such an interaction with a different process or step, such substitution may not be possible in every circumstance. For example, the device or step requiring an interaction via a touch-screen device may be different from, and thus out of the control of, the entity performing the automation. In another example, a regulation, convention, practicality, or the like may inhibit the replacement of, or rely on the inclusion of such interactions. As a result, it may be difficult or impossible to effectively automate activities that require receipt of an instruction or interaction via a touch-screen device.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In at least one aspect of the present disclosure, a system for automated interaction with a touch-screen device includes: at least one optical sensor configured to sense at least a first portion of a touch-screen of the touch-screen device; at least one solenoid including an end effector that is tactilely detectable by the touch-screen, wherein operation of the at least one solenoid causes the end effector to tactilely engage with a second portion of the touch-screen; and a controller that is operatively connected to the at least one optical sensor and the at least one solenoid, and that is configured to operate the at least one solenoid in response to detecting a predetermined characteristic of the touch-screen via the at least one sensor.

In another aspect of the present disclosure, a method of automating interaction with a touch-screen device includes: receiving, at a controller, a signal from at least one optical sensor indicating that the at least one optical sensor has sensed a predetermined characteristic at a first portion of a touch-screen of a touch-screen device; and in response to receiving the signal from the at least one optical sensor, operating, via the controller, at least one solenoid such that an end effector of the solenoid tactilely engages with a second portion of the touch-screen, the end effector being tactilely detectable by the touch-screen.

In a further aspect of the present disclosure, a method for training automation interaction with a touch-screen device includes: presenting, with a controller set in a learn mode, at least one optical sensor with a first portion of a touch-screen of a touch-screen device while the touch-screen device is exhibiting a predetermined characteristic; receiving, via the controller, a signal from the at least one optical sensor; associating, via the controller, the signal with operation of at least one solenoid, wherein the at least one solenoid is operable such that an end effector of the solenoid that is tactilely detectable by the touch-screen tactilely engages with a second portion of the touch-screen, such that, in the use mode, the controller is configured to operate the at least one solenoid to tactilely engages with the second portion of the touch-screen in response to receipt of the signal from the at least one optical sensor.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate various exemplary embodiments and together with the description, serve to explain the principles of the present disclosure.

FIG. 19 depicts a flow diagram of an exemplary embodiment of a learning operation for a controller of an automated interaction system, according to the present disclosure.

FIG. 20 depicts a flow diagram of an exemplary method for automating interaction with a touch-screen device, according to one or more embodiments.

DETAILED DESCRIPTION

Figure 1:
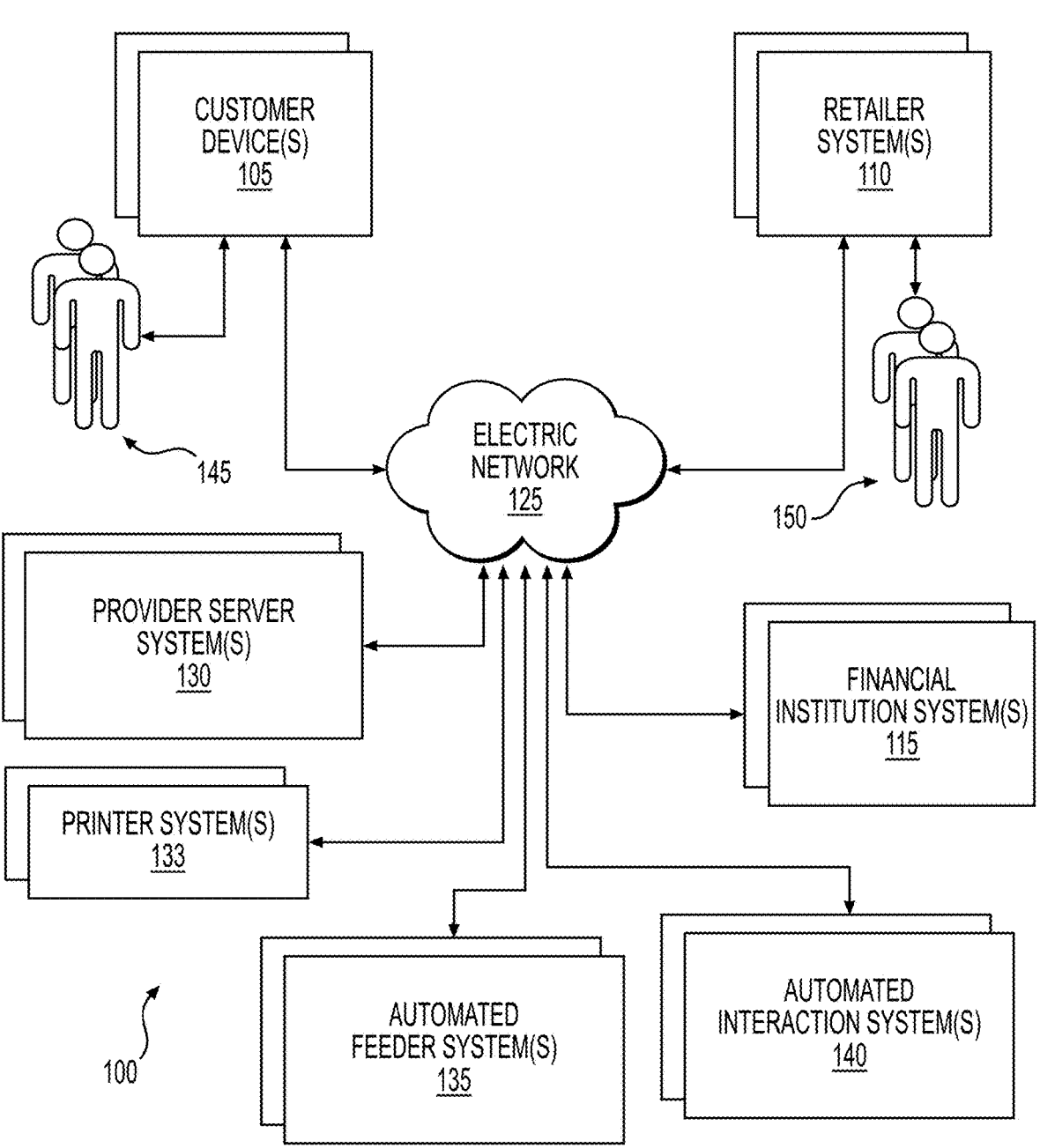
FIG. 1 depicts an exemplary computing environment for automated interaction with a touch-screen device, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," and other variations thereof, are intended to cover a non-exclusive inclusion such that a process, method, or product that recites a list of elements does not necessarily include only those elements, but may include other elements not expressly listed or inherent to such a process, method, article, or apparatus. Relative terms, such as "substantially" and "generally," are used to indicate a possible variation of ±10% of a stated or understood value.

Terms like "retailer," "merchant," "vendor," "seller," and the like generally encompass a person and/or entity that may be involved in the providing and/or sale of goods or services, and in particular of entries into an activity such as a game of chance. A "game of chance" generally encompasses an activity where a participant, e.g., a customer, player, or the like, pays for a chance at winning, e.g., a wager, ticket, entry, or the like. The term "provider" generally encompasses a person and/or entity that facilitates, runs, services, supports, licenses, or oversees an activity, e.g., a game of chance. A provider may provide, for example, one or more of a retailer with entries (e.g., lottery tickets), means to provide entries to customers (e.g., a ticket printer, terminal, etc.), funds and/or prizes to distribute to winners, either directly or indirectly, or the like. It should be understood that, in some circumstances, a retailer may be incorporated into or act as an intermediary for a provider.

An activity according to the present disclosure may involve the use of a touch-screen device. Such an activity may include the receipt of interactions via the touch-screen device before proceeding further. For example, a touch-screen device may request, prompt, or require one or more of a confirmation, an instruction, a setting, or the like that impacts the continued performance of the activity. In an illustrative example, games of chance are generally heavily regulated, and thus the act of purchasing a ticket for such a game generally is associated with one or more regulations or requirements that necessitate interactions with a device that provides the tickets. For instance, a lottery terminal may be configured to generate a ticket for a game of chance in response to insertion of a purchase slip into an appropriate slot of the terminal. Nevertheless, in some jurisdictions, the purchase of the ticket may request and/or require a provider to, for instance, confirm that an age of the purchaser was verified prior to the purchase, and thus the lottery terminal may request and/or require input from the provider via a touch-screen before the purchase can be completed. These type of interactions with a touch-screen device generally represent a break in the chain of operations that are readily able to be automated.

In the following description, exemplary embodiments of the present disclosure will be described with reference to the accompanying drawings. As will be discussed in more detail below, exemplary systems and methods for enabling automated interaction with a touch-screen device are described. Although several examples and embodiments below pertain to providing games of chance, it should be understood that the techniques and technologies disclosed herein may be adapted to any suitable activity associated with a touch-screen device. For example, the techniques and technologies disclosed herein may be adapted to customer-service activities, manufacturing, communications, or any other suitable activity that incorporates use of a touch-screen device, etc.

In an exemplary use case, a customer may desire to play a game of chance. The customer may access an electronic application associated with the game of chance, e.g., via an electronic customer device. The customer may submit a request to purchase one or more entries into the game of chance. The electronic application may submit the request to a provider server system. The provider server system may generate ticket information based on the request, and cause a printer system and/or an automated feeder system associated with the provider to print a physical request slip based on the ticket information. The automated feeder system may submit the physical request slip to a retailer system, e.g., via a mechanical interface. The retailer system may submit the information from the request slip to the provider server system, and the provider server system may transmit one or more wagers corresponding to the one or more purchased entries to the retailer system. The retailer system may generate a physical ticket corresponding to the one or more purchased entries.

At various stages of operation, the retailer system may, via a touch-screen interface thereof, issue one or more prompts and/or require one or more interactions to proceed. For example, the retailer system may request and/or require an instruction to submit the information form the request slip to the provider system. In another example, the retailer system may request and/or require an interaction prior to generating the physical ticket. For instance, the retailer system may request and/or require confirmation that an age of the customer has been verified, etc.

An automated interaction system may be engaged with the retailer system, e.g., in order to automate the interaction with the touch-screen of the retailer device so that the operation of the retailer system may proceed without human intervention.

In an illustrative example, the automated interaction system may include a frame that supports one or more optical sensors and one or more solenoids. The frame may include a first portion, e.g., that is configured to engage with the retailer system, and a second portion, e.g., that is configured to support the solenoid(s) and sensor(s). The second portion may be connected to the first portion via a hinge. The frame may include hinge stops to delineate a position in which the second portion is positioned so that the sensor(s) and solenoid(s) are operatively engaged with a touch-screen of the retailer system, and another position in which, for example, the second portion has been pivoted by the hinge away from the touch-screen so that the sensor(s) and solenoid(s) are accessible. Such access may include, for example, access to a setscrew or the like to set a depth of the sensor(s) or solenoid(s) for interaction with the touch-screen.

The automated interaction system may be configured to recognize when an interaction is required by the retailer system. For example, the automated interaction system may include one or more optical sensors, each configured to sense a respective portion of the touch-screen. Upon identifying a predetermined state of the touch-screen, e.g., by identifying a predetermined characteristic of the touch-screen via the one or more optical sensors, the automated interaction system may operate one or more solenoid with a tactile end to interact with a second portion of the touch-screen predetermined to be operative for the interaction required by the retailer system. In other words, the automated interaction system may use one or more sensors to recognize a display on the touch-screen for which an interaction is required, and then in response may operate one or more actuators to accordingly interact with the touch-screen to proceed. The operation of the automated interaction system may be effected by a controller, e.g., such that the automated interaction system may be operated automatically and without human intervention. In some cases, the automated interaction system may be integrated with the printer and/or feeder device, e.g., to be aware of a need, e.g., an imminent need, to facilitate an interaction and/or indicate that the retailer system is ready to receive a physical request slip.

In some instances, the automated interaction system may include a scanner device configured to scan information present on the physical ticket generated by the retailer system. Such information may include a code and/or other information associated with the wager or the customer associated with the physical request slip used by the retailer system to generate the physical ticket.

The automated interaction system and/or the scanner device may be in communication with the provider system and/or the feeder or printer device. For example, the provider system may associate the physical ticket with the request from the customer and/or the request slip, and/or may transmit information regarding the one or more wagers to the customer, e.g., via the electronic application of the electronic customer device.

In another exemplary use case, a touch-screen device may receive material (e.g., physical material such as a request slip) from a device via a mechanical interface (e.g., a feeder system or the like). The touch-screen device may, during the course of generating a physical output in response to the input material, prompt and/or require an interaction via a touch-screen of the touch-screen device to proceed. For instance, one or more portions of the touch-screen may output a color, graphic, and/or text that is indicative of or associated with the requested information, e.g., a needed interaction. An automated interaction system may, via one or more optical sensors, sense that at least a portion of the touch-screen corresponds to a predetermined characteristic, e.g., that is associated with a requested or needed interaction, and in response to such sensing, may operate one or more solenoids to engage with a second portion of the touch-screen in order to effectuate the interaction. The retailer system may generate a physical output. A scanner device, or the like, may capture information from the physical output and provide such information to one or more of a customer device (e.g., electronic customer device), a provider server system, or the like.

In some instances, the generation of the physical output by the retailer system may be unsuccessful, e.g., due to a jam in the conveyance of physical material, an error in capturing information from the material, an error in the information of the material, a fault in the automated feeder system or the retailer system, or the like. In some instances, the generation of the physical output may be unsuccessful due to unsuccessful completion of a required interaction. In some instances, the scanner device may be configured to detect a rejection of material. For instance, the scanner device may detect that no physical output was generated in response to input material. In some instances, such detection may be transmitted to another device, e.g., a provider system, a feeder, system, etc.

FIG. 1 depicts an exemplary computing environment 100 that may be utilized with systems and methods presented herein. One or more customer device(s) 105, one or more retailer system(s) 110, and/or one or more financial institution system(s) 115, may communicate across an electronic network 125. As will be discussed in further detail below, one or more provider server system(s) 130, one or more printer systems 133, one or more automated feeder system(s) 135, and one or more automated interaction system(s) 140 may communicate with each other and/or one or more of the other components of the computing environment 100. Each customer device 105 may be associated with a respective customer 145. Each retailer system 110 may be associated with a respective retailer 150.

The systems and devices of the computing environment 100 may communicate in any arrangement. As will be discussed herein, systems and/or devices of the computing environment 100 may communicate in order to, for example, operate a game of chance in a manner that provides electronic interaction in association with physical tickets for the game of chance. Further, it should be understood that the systems and methods discussed herein may be adopted to any suitable activity associated with a physical document or physical material and/or a physical output.

The customer device 105 may be an electronic device with a computer system, such as, for example, a desktop computer, a smart phone or other mobile device such as a tablet computer, smart watch, etc. In an exemplary embodiment, the customer device 105 is a smart phone, or the like. In some embodiments, the customer device 105 may include one or more electronic application(s), e.g., a program, plugin, etc., installed on a memory of the customer device 105. In some embodiments, the electronic application(s) may be associated with one or more of the other components in the computing environment 100. For example, the electronic application(s) may include customer authentication tools, a digital wallet of the customer, an application that provides access to an online portal, website, or the like for a game of chance hosted by the provider server system 130, or the like.

In some embodiments, a retailer 150 may be associated with a plurality of retailer systems 110. In some embodiments, the retailer system 110 may include a game terminal machine, or the like. A game terminal machine generally encompasses a computer system associated with a game of chance and configured to facilitate and/or execute purchases of entries into the game of chance. In some embodiments, the game terminal machine may include a printing mechanism operable to print a physical ticket corresponding to a request for an entry into the game of chance. In some embodiments, the game terminal machine may include at least one sensor configured to capture request information, e.g., from a physical request slip, and the game terminal machine may be configured to obtain and/or output, e.g., print, a physical ticket based on the request information included on a received request slip. The game terminal machine may be configured to parse information from a captured image. For example, the game terminal machine may employ a text recognition algorithm, an image recognition algorithm, a bubble-form reader (e.g., a Scantron™ reader), or the like to parse information captured from a received request slip. As discussed in further detail below, the retailer system 110, such as a game terminal machine, may include an interface for interacting with a retailer 150 or other user. For example, the retailer system 110 may include a touch-screen configured to receive tactile input from a user and to display an output of information, prompts for input, or the like.

As used herein, a device having a touch-screen interface, e.g., a retailer system 110, may also be referred to as a touch-screen device. Additionally, although discussed above with regard to a game terminal machine or a retailer system 110, or the like, it should be understood that the disclosure herein may be similarly applied to any other suitable touch-screen device.

A financial institution system 115 may include, for example, a computer system associated with one or more of a banking institution, a credit card institution, or the like. The financial institution system 115 may include financial data related to one or more of the customer 145, the retailer 150, a provider associated with the provider server system 130, or the like. The financial institution system 115 may be configured to facilitate and/or execute financial transactions by and/or between one or more persons and/or entities utilizing the computing environment. Financial data may include, for example, account information, authentication information, transaction information, or the like.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to and/or accessing source data or information from a location, local or remote, from other devices or networks coupled to the Internet. "Online" may also encompass to connecting or accessing an electronic network (wired or wireless) via a mobile communications network or device. The Internet is a worldwide system of computer networks-a network of networks in which a party at one computer or other electronic device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

The provider server system 130 may be configured to provide and/or host an activity such as a game of chance, facilitate and/or execute requests and/or purchases for the activity such as entries into the game of chance, facilitate and/or execute transactions associated with the activity such as transferring funds to and from the customer 145 and/or the retailer 150, the provider server system 130, etc., or the like. The provider server system 130 may include data regarding associations that may be included in a request for an entry into a game of chance and corresponding information on a physical request slip for the entry. For example, in some embodiments, the provider server system 130 includes a mapping of aspects of a request to information on a physical request slip.

The provider server system 130 may include an electronic application, a portal, a webpage, or the like that facilitates one or more of purchasing entries for the game of chance, monitoring a position of an entry, validating a position of an entry for a concluded game of chance, transferring funds between one or more of the customer 145, retailer 150, e.g., via the financial institution system 115, or the like. The provider server system 130 may include instructions and/or rules operable to execute the hosting of the game of chance. In some embodiments, as discussed in further detail below, the provider server system 130 may be in communication with or otherwise integrated with the automated interaction system 140.

The printer system 133 may be operable, e.g., by the provider server system 130, to print a physical request slip based on a request for one or more entries. For example, the printer system 133 may be configured to receive entry request information, e.g., from the customer device 105, the retailer system 110, and/or the provider server system 130. The printer system 133 may be configured to print a physical request slip based on received request information. In some embodiments, the printer system 133 may be configured to automatically convey a printed physical request slip to the automated feeder system 135. In some embodiments, a person and/or another device may assist in conveying physical request slips printed by the printer system 133 to the automated feeder system 135.

The automated feeder system 135 may be configured to convey and submit physical request slips to the retailer system 110. In some embodiments, the automated feeder system 135 and/or another system may include one or more sensors configured to capture ticket information from a conveyed request slip.

The automated interaction system 140 may be configured to recognize when an interaction via the touch-screen of the retailer system 110 is needed or desired, and to provide that interaction. For example, as discussed in further detail below, the automated interaction system 140 may include one or more sensors usable to determine a state or characteristic of the interface of the retailer system 110, and may include one or more actuators that are operable to interact with the touch-screen to provide a desired interaction.

Although depicted as separate components in FIG. 1, it should be understood that a component or portion of a component may, in some embodiments, be integrated with or incorporated into one or more other components. For example, a portion of the provider server system 130 may be provided to the customer device 105 as an electronic portal via the electronic application. At least a portion of provider server system 130 and/or the automated feeder system 135 may be integrated into the retailer system 110, or vice versa. The printer system 133 may be integrated into the automated feeder system 135 or vice versa. The automated interaction system 140 may be integrated with or in communication with the automated feeder system, the provider server system 130. Any suitable arrangement of the various systems and devices of the computing environment 100 may be used.

Figure 2:
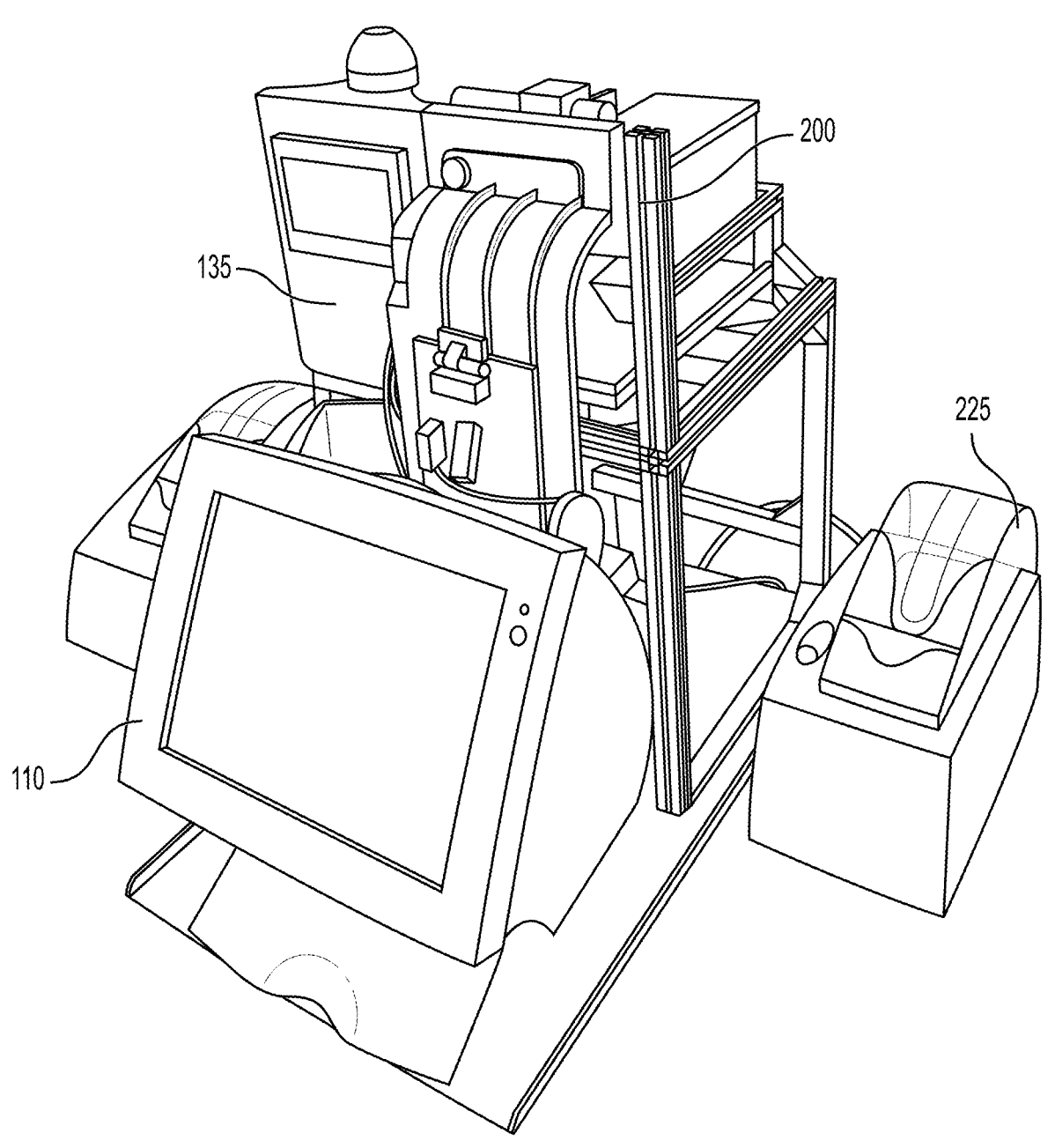
FIG. 2 depicts a perspective image of an exemplary embodiment of an assembly of a retailer system, a feeder unit, and a printer system, according to the present disclosure.
Figure 3:
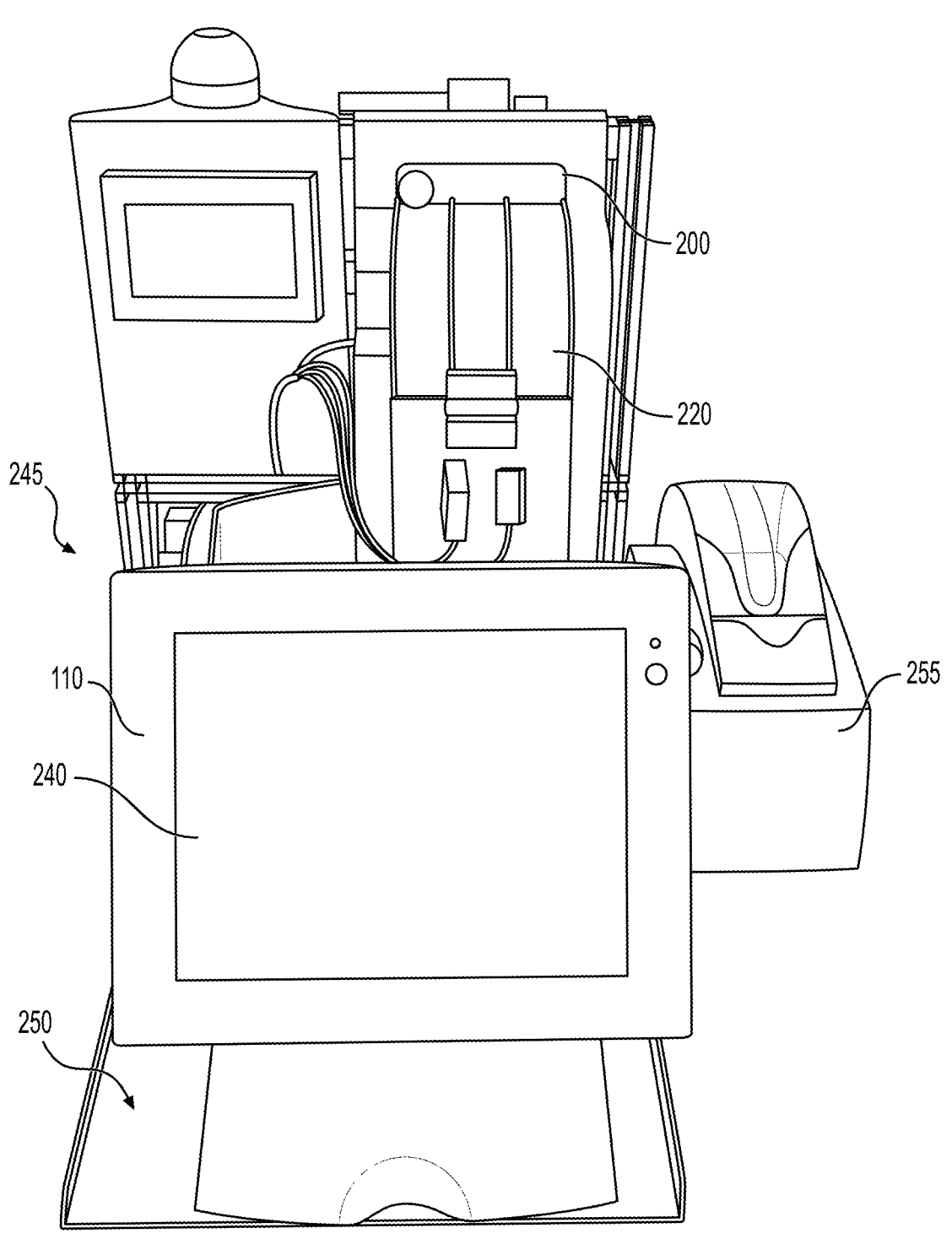
FIG. 3 depicts a front view of the assembly of FIG. 2.

FIG. 2 depicts a perspective view of an exemplary assembly of a retailer system 110 with a feeder unit 200 of an automated feeder system 135, and a printer system 255, and FIG. 3 depicts a front view of the assembly. As shown in FIG. 3, the retailer system 110 may include, for example, a touch-screen 240 acting as a retailer interface, a physical request slip input 245, a physical request slip output 250, and a ticket printer 255. The touch-screen 240 may be any suitable type of touch-screen interface, and may optionally include further interface elements such as physical buttons or switches. The touch-screen 240 may, for example, be configured to enable a user, e.g., a retailer 150, to direct and/or adjust operation of the retailer system 110, e.g., select a game of chance for the printing of tickets, retrieve information regarding printed tickets, etc. The retailer system 110 may be mounted so that the physical request slip input 245 is engaged with the feed neck 220 of the feeder unit 200. The retailer system 110 may be configured to scan, capture, parse, or the like, information from a received physical request slip.

In some embodiments, the retailer system 110 may be mounted so that the physical request slip output 250 is configured to convey physical request slips, e.g., that have been scanned by the retailer system 110, into a repository, bin, or the like. The retailer system 110 may be configured to operate the ticket printer 255 to print a physical ticket based on information from a received physical request slip. In some embodiments, the ticket printer 255 may be configured to convey printed physical tickets to a repository, bin, or the like. In some embodiments, the ticket printer 255 may be configured to convey printed physical tickets to a scanner, image capture device, or the like that may be configured to capture information from the physical ticket. In some embodiments, such conveyance may be manual, e.g., by a person.

It should be understood that the assembly in FIGS. 2 and 3 is exemplary, and that in various embodiments, the retailer system 110 may operate with or without various components. For example, in various embodiments, a retailer system may be configured to receive various types of material, e.g., slips, ballots, documents, packages, or any other suitable object, and thus may be in communication with various components for conveying such material.

Figure 4:
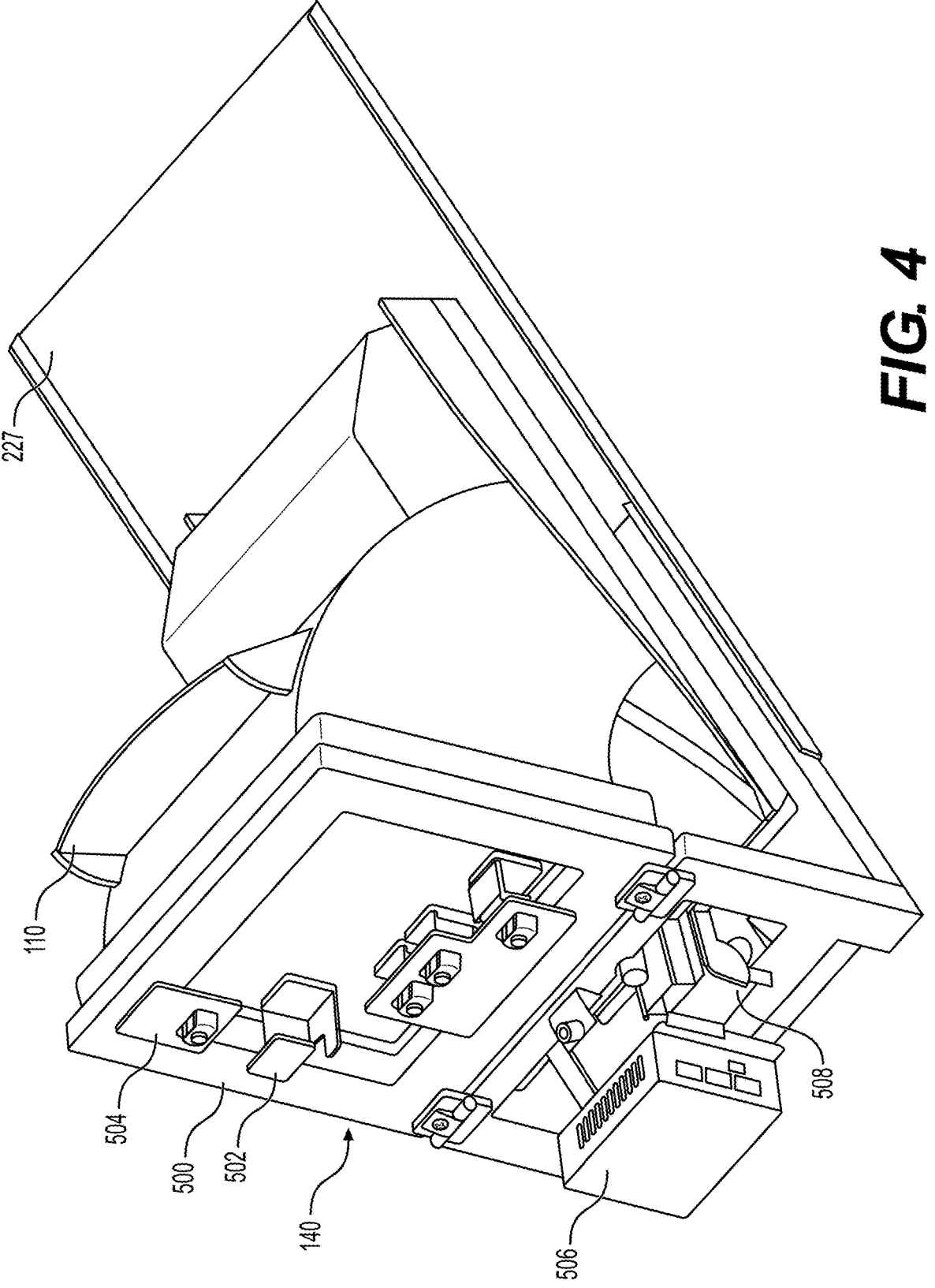
FIG. 4 depicts a perspective view of an exemplary embodiment of an automated interaction system engaged with a retailer system and a support plate, according to the present disclosure.
Figure 5:
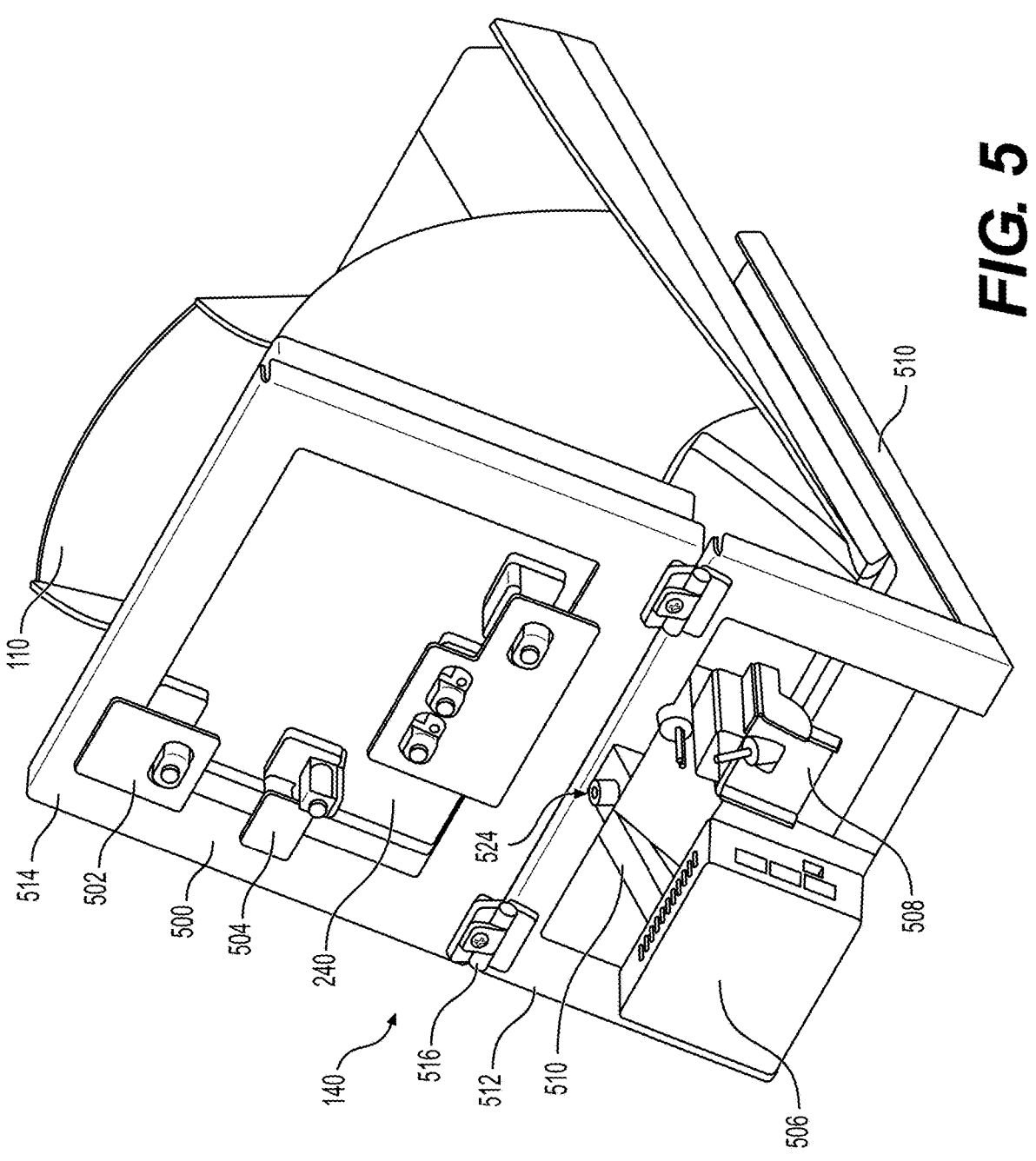
FIG. 5 depicts a perspective view of an exemplary embodiment of an automated interaction system engaged with a retailer system, according to the present disclosure.

FIG. 4 depicts a perspective view of an exemplary embodiment of an automated interaction system 140 engaged with a retailer system 110 and a support plate 227. FIG. 5 depicts a perspective view of an exemplary embodiment of the automated interaction system 140 engaged with the retailer system 110 in which the support plate 227 is not shown for clarity.

As shown in FIG. 5, the automated interaction system 140 may include a frame 500, at least one optical sensor 502, at least one solenoid 504, a controller 506, and a code scanner 508. The frame 500 may be configured to support the at least one solenoid 504 and the at least one optical sensor 502 so as to be within an operative range of the touch-screen 240, as discussed in further detail below, and may be configured to engage with a touch-screen device, e.g., the retailer system 110.

For example, as depicted in FIG. 5, the frame 500 includes arms 510 configured to laterally restrain the retailer system 110 when engaged with the automated interaction system 140. In some embodiments, the arms 510 do not axially restrain the retailer system 110 relative to the automated interaction system 140, e.g., so that a distance between the touch-screen 240 and the automated interaction system 140 may be adjusted by axially moving the retailer system 110. In some embodiments, the arms 510 may include one or more slots configured to receive a portion of the retailer system 110, e.g., one or more feet (projections) of the retailer system 110, which may serve to laterally locate the retailer system 110 relative to the automated interaction system 140. As discussed in further detail below, relative positions of the retailer system 110 and the automated interaction system 140 may be set and/or restrained via attachment with the support plate 227.

The frame 500 may include a first portion 512 and a second portion 514. The first portion 512 may be a static portion, e.g., a portion configured to remain static relative to the retailer system 110. For example, the first portion 512 may include the arms 510 and/or may be fixed to the support plate 227, as discussed in further detail below.

The code scanner 508 may be mounted in the first portion 512 of the frame 500. In an exemplary embodiment, the code scanner 508 may include, for example, a bar code reader, an optical sensor, an infrared sensor, or the like. The code scanner 508 may be positioned so as to be operable to detect and/or scan physical tickets or other material generated by the retailer system 110. The code scanner 508 may be in communication with and/or operable by the controller 506, as discussed in further detail below.

Figure 6:
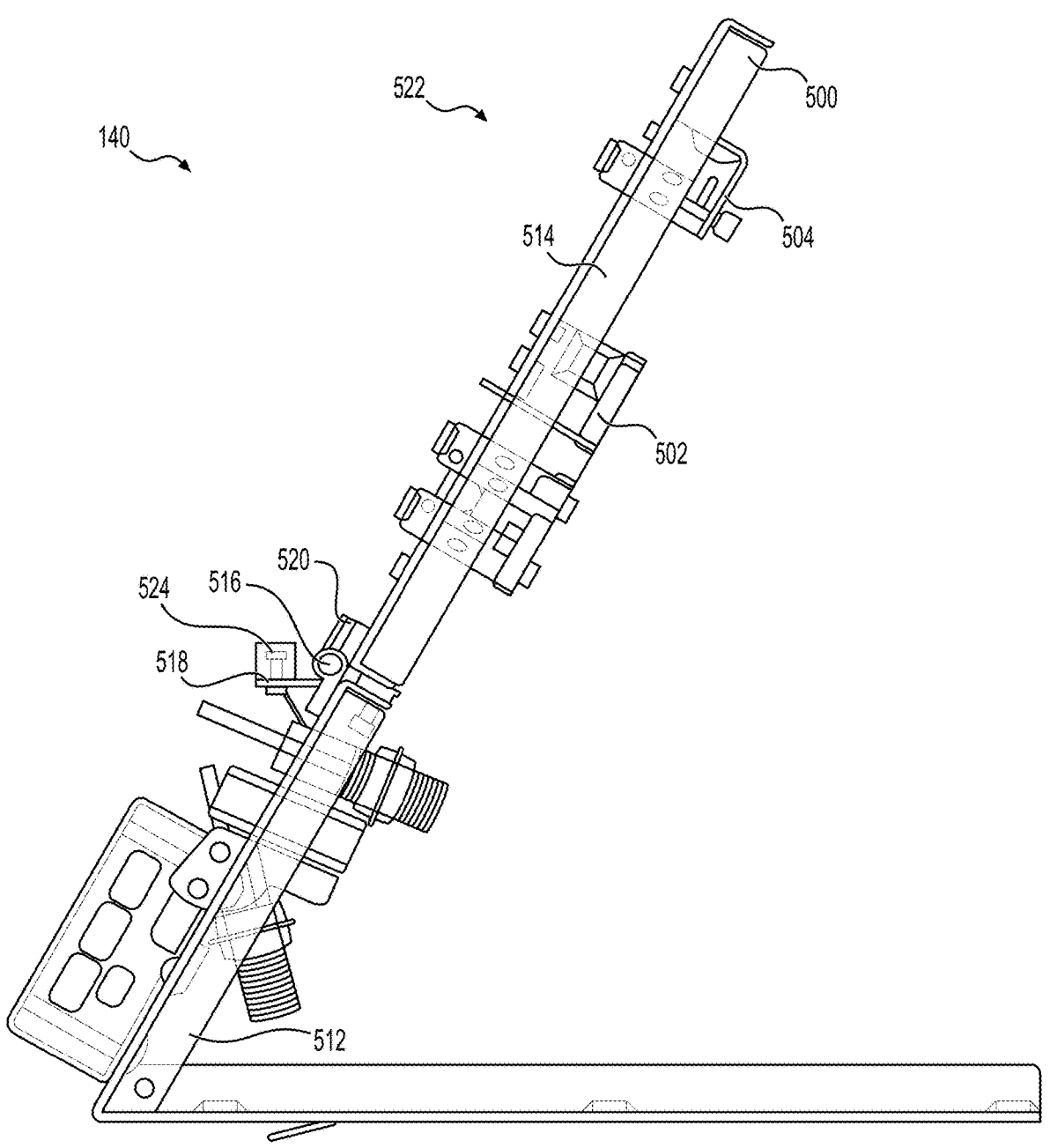
FIG. 6 depicts a side view of an exemplary embodiment of an automated interaction system, according to the present disclosure.

The second portion 514, may be movable relative to the first portion 512. For example, in the example depicted in FIG. 5, the second portion 514 is connected to the first portion 512 via one or more hinges 516 that support movement of the second portion 514. While two hinges 516 are shown in FIG. 5, the first and second portions 512, 514 may be coupled together by one hinge, or by more than two hinges. FIG. 6 depicts a side view of the automated interaction system 140 without the retailer system 110 or support plate 227 engaged thereto. As shown in FIG. 6, the frame 500 may further include one or more hinge stops 518 that delimit a range of motion of the second portion 514 in at least one direction. In some embodiments, the hinge 516 may itself include a hinge stop structure 520 configured to limit motion of the hinge 516 in at least one direction. By limiting the range of motion of the second portion 514 relative to the first portion 512, the hinge stop(s) 518 and/or hinge stop structure(s) 520 may delimit one or more positions of the second portion 514.

For example, FIG. 6 depicts the second portion 514 in a first position 522 in which the at least one optical sensor 502 and the at least one solenoid 504 are operatively engaged with the touch-screen 240, as discussed in further detail below. Returning to FIG. 5, in some embodiments, the frame 500 may include a magnetic stop 524 configured to releasably hold the second portion 514 in the first position 522. In this example, the magnetic stop 524 is positioned on the first portion 512 at a location between the two hinges 516. In various embodiments, any suitable releasable constraint may be used instead of or in addition to the magnetic stop 524, e.g., a hook and loop fastener, a snap, etc.

Figure 7:
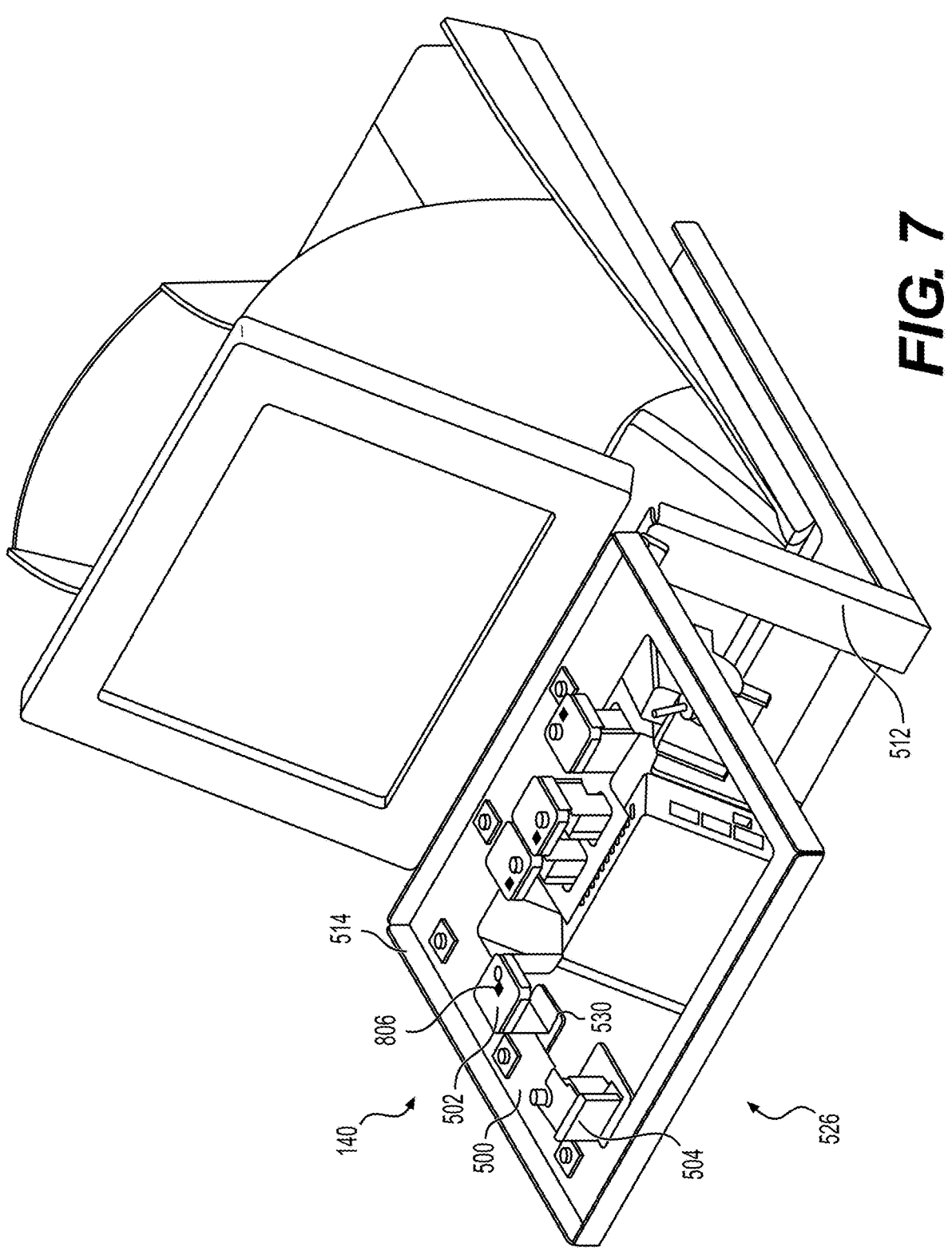
FIG. 7 depicts a perspective view of another exemplary embodiment of an automated interaction system engaged with a retailer system, according to the present disclosure.

FIG. 7 depicts an exemplary embodiment of the automated interaction system 140 in which the second portion 514 of the frame 500 is in a second position 526, e.g., in which the second portion 514 has been moved away from the touch-screen 240. In this second position 526, portions of the at least one optical sensor 502 and the at least one solenoid 504 inaccessible with the second portion 514 while in the first position 522 (FIG. 5) may be accessible. Access to such portions of the at least one optical sensor 502 and the at least one solenoid 504 may be beneficial, e.g., for repair, replacement, and/or fine-tuning a position of the at least one optical sensor 502 and the at least one solenoid 504 on the frame 500 so as to operatively engage with the touch-screen 240 when the second portion 514 is in the first position 522.

For example, the at least one optical sensor 502 and/or the at least one solenoid 504 may include an adjustment member 530, e.g., a set screw or the like, that is operable to adjust a set depth within the second portion 514 of the frame 500. By adjusting an adjustment member 530, the distance between the touch-screen 240 and the at least one optical sensor 502 and/or the at least one solenoid 504, when the second portion is in the second position 526, may be modified.

As discussed in further detail below, the frame 500 may be configured to support the at least one optical sensor 502 and/or the at least one solenoid 504 in various positions. For example, the at least one optical sensor 502 and/or the at least one solenoid 504 may be positioned so as to interact with different regions of the touch-screen 240.

Figures 8, 9:
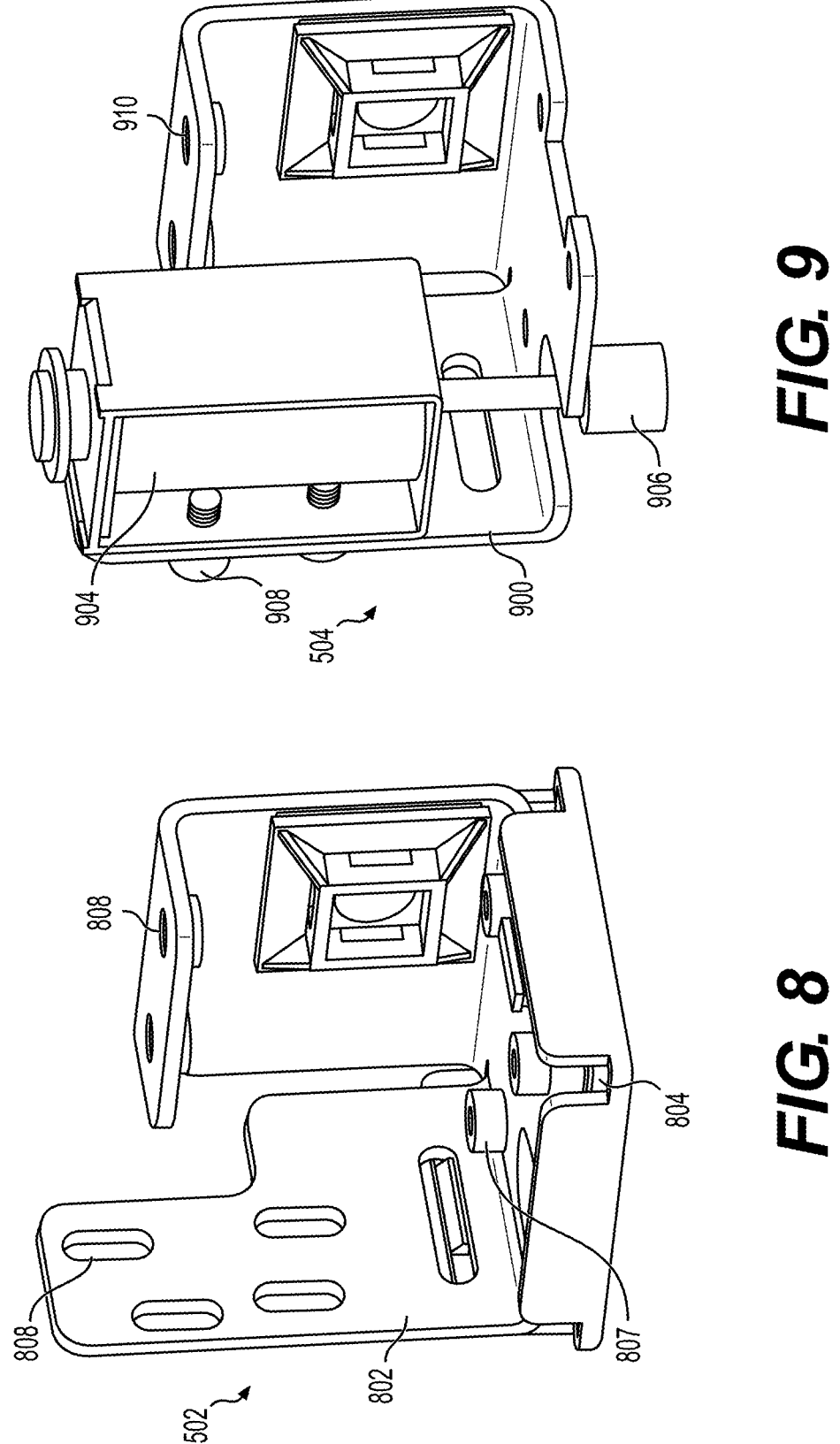
FIG. 8 depicts a perspective view of an exemplary embodiment of an optical sensor usable with an automated interaction system, according to the present disclosure.
FIG. 9 depicts a perspective view of an exemplary embodiment of a solenoid usable with an automated interaction system, according to the present disclosure.

FIG. 8 depicts a perspective view of an exemplary embodiment of an optical sensor 502 that may be usable with the automated interaction system 140. The optical sensor 502 may include a housing 802, a circuit board 804, a sensor aperture (not visible, see the sensor aperture 806 in FIG. 7), and one or more contacts 807. The housing 802 may include various mounting structures 808 that are configured to mount the optical sensor 502 in various configurations with the frame 500. The circuit board 804 may include hardware and/or software for the optical sensor 502. For example, the circuit board 804 may include, for example, a photo-sensor or the like. The contacts 807 may be configured to operatively connect the optical sensor 502 to the controller 506 or the like.

In an exemplary embodiment, the optical sensor 502 includes an RGB sensor. For example, the optical sensor 502 may be configured to generate a signal indicative of a color sensed by the optical sensor 502. In some embodiments, the optical sensor 502 may be configured to generate a signal only in response to sensing a particular color, as discussed in further detail below. In some embodiments, the optical sensor 502 is a one-dimensional sensor. For example, the optical sensor 502 may be configured to sense an overall color incident on the aperture 806. In some embodiments, the optical sensor 502 may include a photo array configured to sense different colors at different locations (e.g., sensing colors pixel by pixel), and may be configured to generate a signal indicative of the color(s) and or location(s) of the color(s) sensed by the photo array. Any suitable type of optical sensor may be used.

FIG. 9 depicts a perspective view of an exemplary embodiment of a solenoid 504 usable with the frame 500. The solenoid 504 as shown includes a housing 900, an actuator housing 902, an actuator body 904, an end effector 906, and one or more contacts 908. The housing 900 may include one or more mounting structures 910. The actuator housing 902 may be mounted with the housing 900, and the actuator body 904 may be mounted within the actuator housing 902. The actuator body 904 may be operable to axially move the end effector 906 relative to the actuator body 904. For example, the actuator body 904 may include an electromagnet or a pneumatic actuator. The end effector 906 may be configured to be operatively interactive with a touch-screen. For example, the end effector 906 may include or be coated with an electrically conductive material that can be sensed by a capacitive touch screen. In another example, the end effector may include a rigid material adapted for use with a resistive touch screen.

Figures 10, 11:
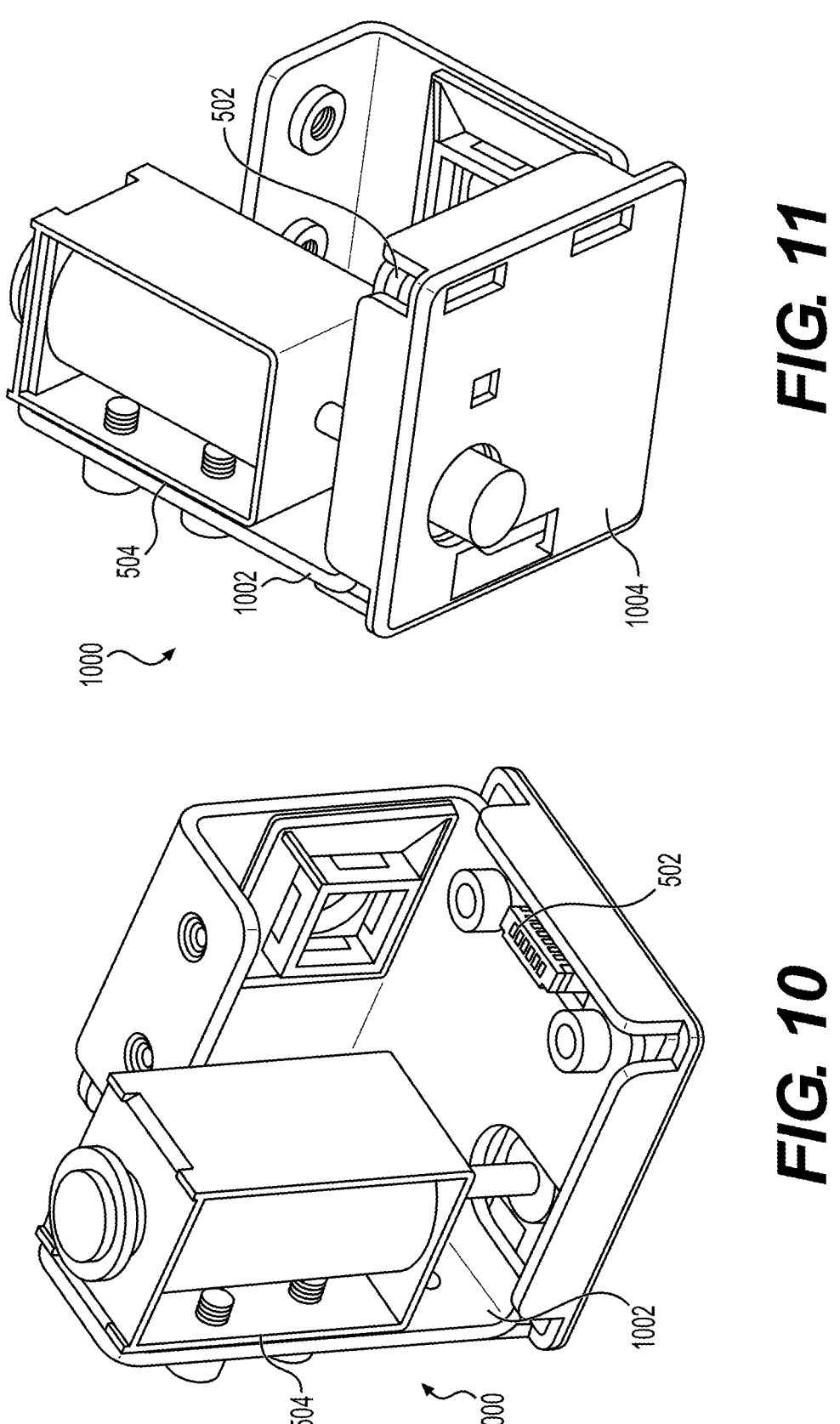
FIG. 10 depicts a top perspective view of an exemplary embodiment of an optical sensor and solenoid hybrid assembly, according to the present disclosure.
FIG. 11 depicts a bottom perspective view of the optical sensor and solenoid hybrid assembly of FIG. 10, according to one or more embodiments.
Figure 12:
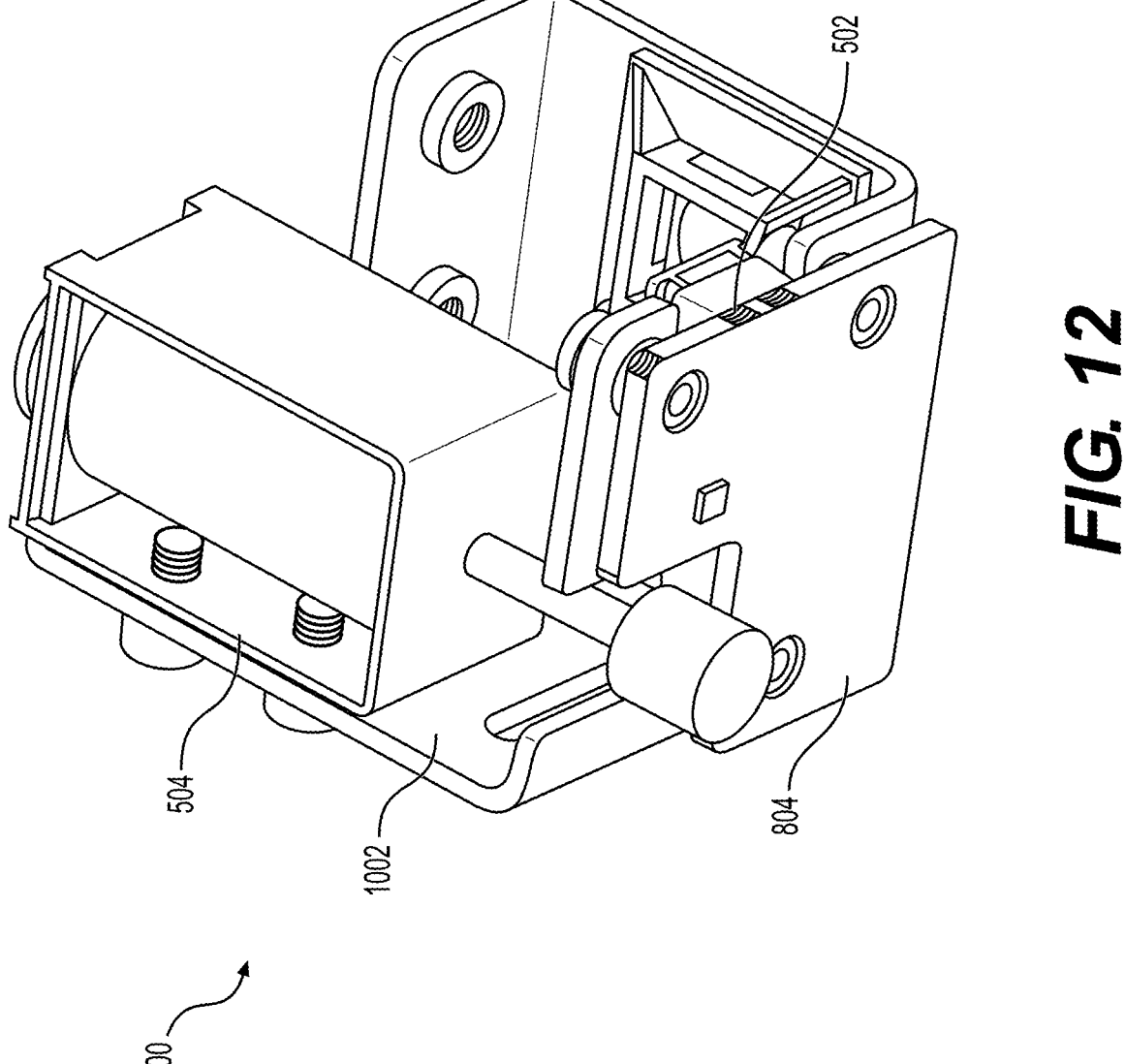
FIG. 12 depicts a bottom perspective view of another exemplary embodiment of an optical sensor and solenoid hybrid assembly, according to the present disclosure.

FIGS. 10 and 11 depict top and bottom perspective views of an optical sensor and solenoid hybrid assembly 1000 that may be used with the methods and systems herein. The assembly 1000 as shown includes a housing 1002 that includes a solenoid 504 and an optical sensor 502. Such a hybrid assembly 1000 may facilitate interacting with a portion of a touch-screen that is the same as or proximate to a region of the touch-screen to be sensed. FIG. 12 depicts a bottom perspective view of the assembly 1000 in which a bottom plate 1004 from FIG. 11 has been removed so as to show a circuit board 804 for the optical sensor 502.

Figure 13:
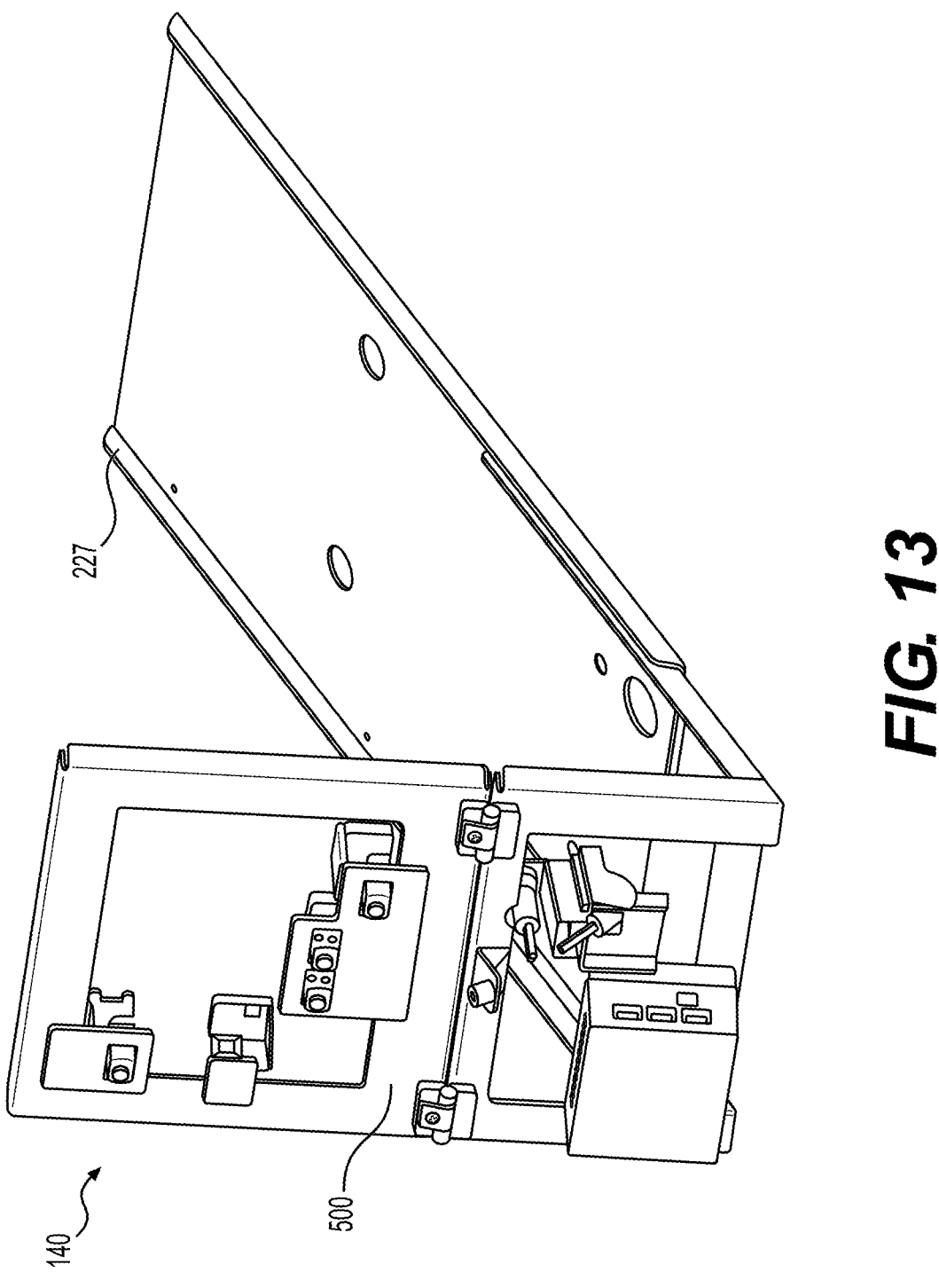
FIG. 13 depicts a perspective view of an exemplary embodiment of an assembly of a frame of an automated interaction system engaged with a support plate, according to the present disclosure.
Figure 14:
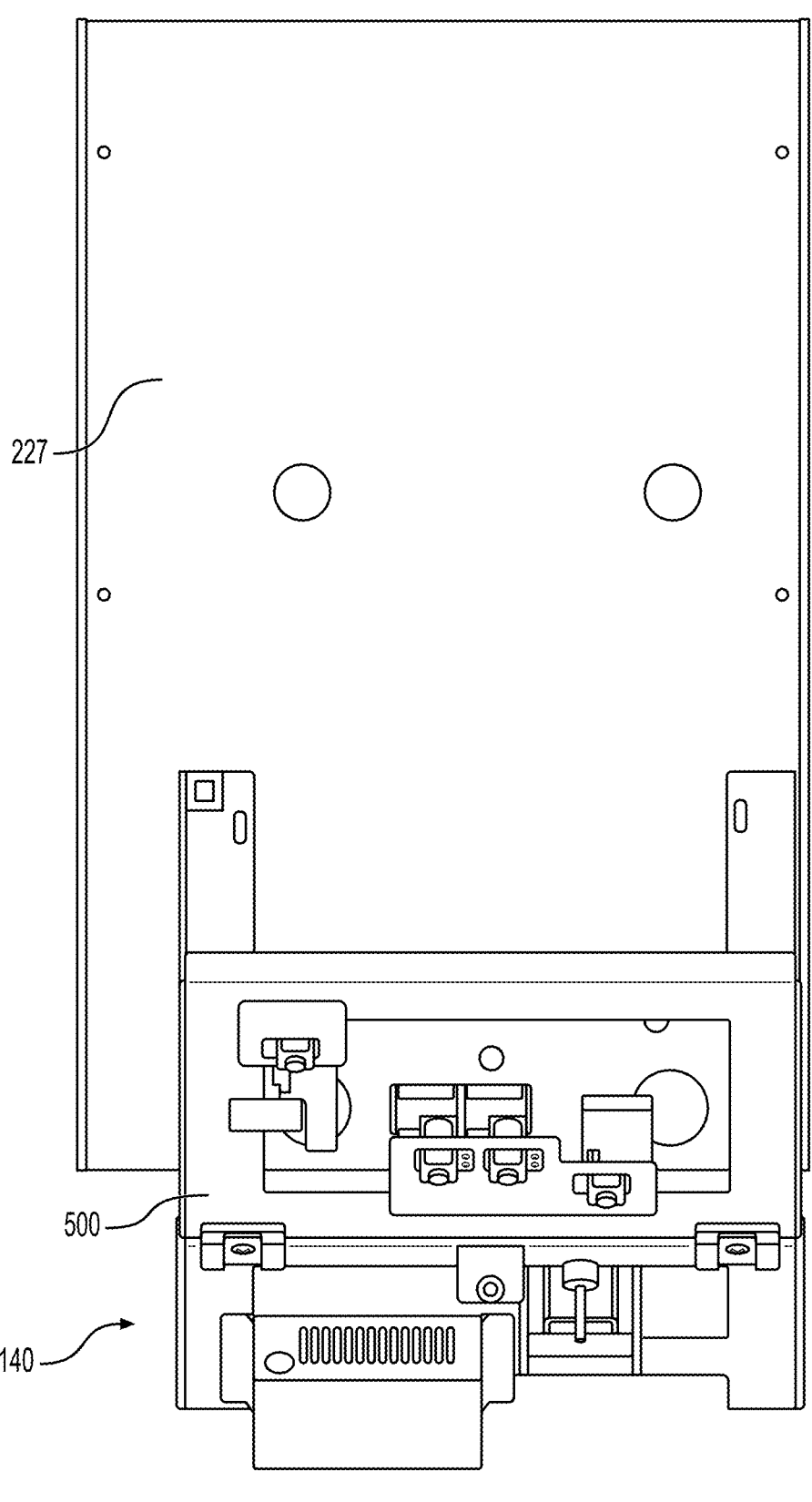
FIG. 14 depicts a top view of the assembly of FIG. 13.
Figure 15:
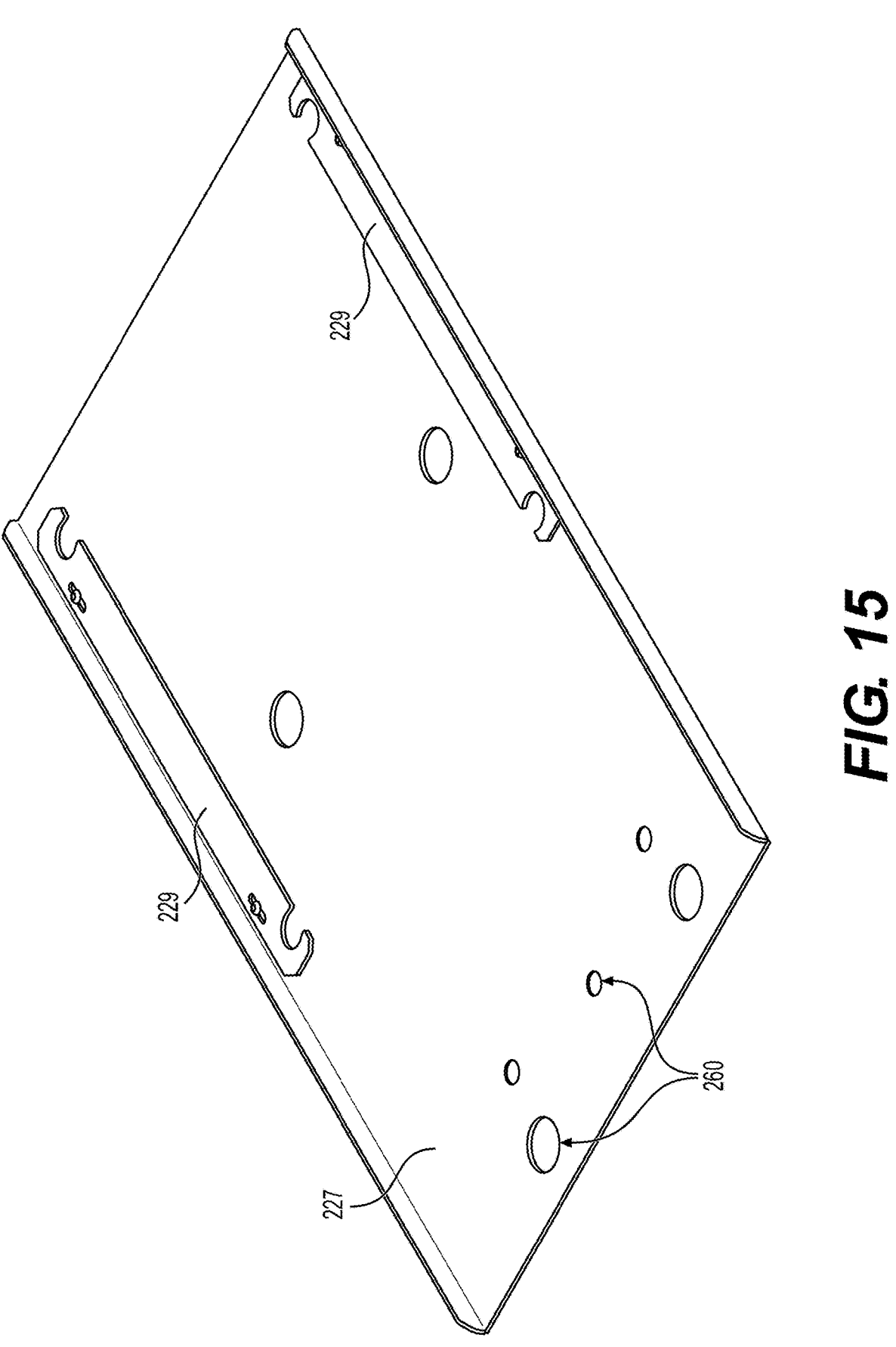
FIG. 15 depicts a perspective view of an exemplary embodiment of a support plate, according to the present disclosure.
Figure 16:
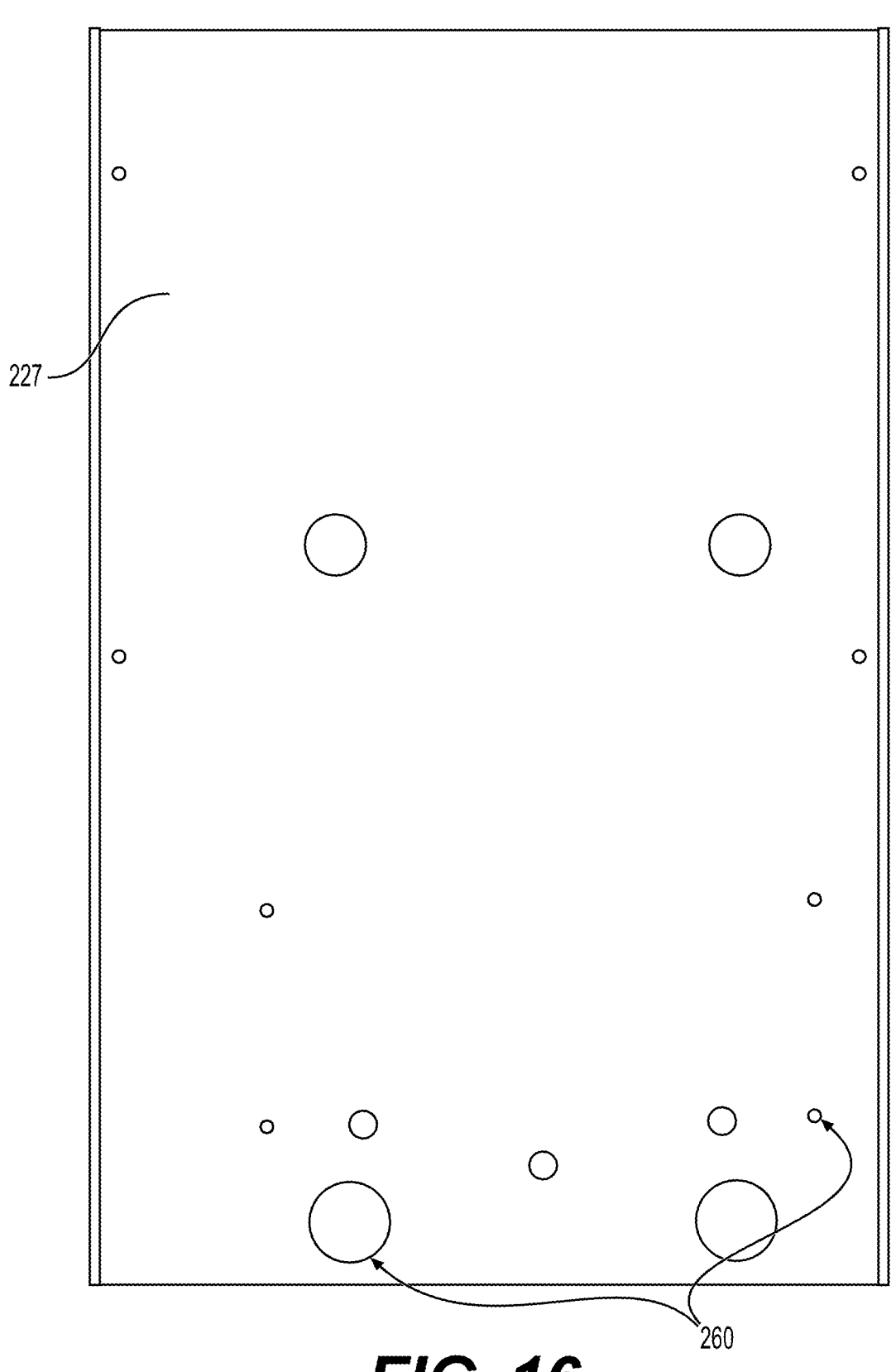
FIG. 16 depicts a top view of the support plate of FIG. 15.

FIGS. 13 and 14 depict perspective and top views, respectively, of exemplary embodiment of a frame 500 engaged with a support plate 227. FIGS. 15 and 16 depict perspective and top views, respectively, of an exemplary support plate 227 without the frame 500. The support plate 227 may include one or more holes 260 that may provide, for example, an attachment point for a fastening device such as a screw or bolt and/or a pass-through for wiring. In an example, one or more of the holes 260 may facilitate fastening the frame 500 to the support plate 227. In the example depicted in FIGS. 15 and 16, the support plate 227 includes a mounting structure 229 configured to mount the support plate 227 to a device operable to feed material to the retailer system 110, e.g., an automated feeder system or the like. For example, the support plate 227, e.g., via holes 260 and/or mounting structure 229, may be configured to locate and mount various components of the computing environment 100 relative to each other.

Figure 17:
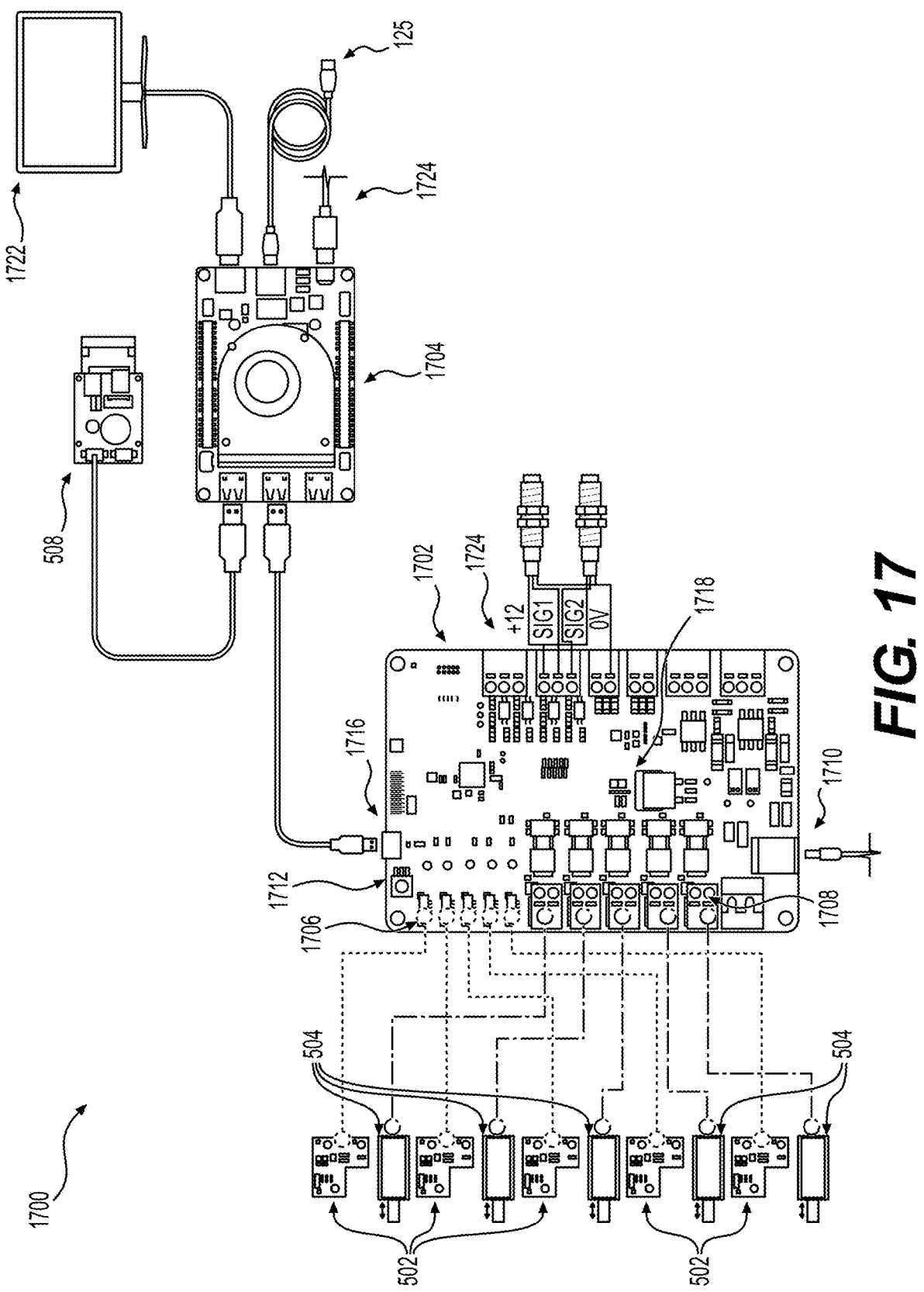
FIG. 17 depicts a schematic of an exemplary embodiment of a controller for an automated interaction system, according to the present disclosure.

FIG. 17 depicts an exemplary schematic 1700 for the controller 506. As illustrated in FIG. 17, the controller 506 includes a circuit board 1702 and a computing system 1704. The circuit board 1702 includes a plurality of sensor contacts 1706, a plurality of solenoid contacts 1708, a power supply port 1710, an indicator 1712, a plurality of jumper ports 1714, a data communication port 1716, and an integrated electrical component or circuit 1718. While one circuit 1718 is shown in FIG. 17, the controller 506 may include a plurality of circuits.

The sensor contacts 1706 may be in communication with the optical sensor(s) 502, and the solenoid contacts 1708 may be in communication with the solenoid(s) 504. In an example, the one or more integrated electrical components or circuits 1718 may include circuitry and/or logic for controlling and/or receiving signals from the sensor(s) 502 and/or solenoid(s) 504. Any suitable power supply may be used with the power supply port 1710. For example, the power supply may be a 12 volt, 100 watt DC power supply. The indicator 1712 may be operable to show a status of the controller 506, e.g., whether the controller is in a learn mode or a use mode (as discussed in further detail below), an error condition, a power condition, an indication of a detection by an optical sensor 502, or an indication of operation of a solenoid 504.

The data communication port 1716 may be configured to provide communication between the circuit board 1702 and the computer system 1704. The computer system 1704 may be in communication with the code scanner 508, the electronic network 125, an interface 1722, and a computer system power source 1724. In an exemplary embodiment, the computer system may be or include a single board computer, a micro-workstation, a terminal client computer, or the like.

In an exemplary embodiment, the computer system 1704 may be configured to operate a graphical user interface (GUI) for the automated interaction system 140, e.g., via the interface 1722. The GUI may enable a user, e.g., a provider and/or a retailer 150, to view status information and/or change settings for the automated interaction system 140. For example, in some embodiments, the GUI may be usable to set and/or modify logic or instructions for which solenoid(s) 504 are operated in response to sensing colors in portions of the touch-screen 240 via which optical sensor(s) 502, e.g., in conjunction with a learn mode of the controller 506 as discussed in further detail below. Status information that may be displayed by the GUI may include, for example, a current operating condition of the automated interaction system 140 or components thereof, an error indication, statistical information such as operating time, number of interactions conducted, number of physical tickets scanned by the code reader 508, etc.

In some embodiments, the computer system 1704 may be in communication with or otherwise integrated with a device configured to mechanically feed material to the retailer system 110, e.g., via the electronic network 125. For example, in some embodiments, the computer system 1704 may receive a signal indicative that the device is mechanically feeding a next instance of material to the retailer system 110, e.g., whereby the computer system 1704 may be configured to expect or prepare for the retailer system 110 to generate a further physical ticket. Preparation in such an instance may include activating one or more of the sensor(s) 502, solenoid(s) 504, the code scanner 508, and/or operating logic or instructions for controlling the same and/or other components of the computing environment 100. In some embodiments, the computer system 1704 may be configured to transmit an instruction to the device to initiate the delivery of material to the retailer system 110. For example, in response to detecting, e.g., via the code scanner 508, that a physical ticket has exited the retailer system 110, and thus that the retailer system 110 may be ready for another round of operation, the computer system 1704 may instruct the device to deliver another instance of material to the retailer system 110.

The jumper ports 1714 may be usable for a variety of purposes. For example, in the embodiment illustrated in FIG. 17, one or more additional sensors 1720 may be connected to a first set of jumper ports 1714, whereby such sensors 1720 may be used, for example, to sense an arrival and/or departure of a physical ticket generated by the retailer system 110 to and/or from a scanning region of the code scanner 508. For instance, such sensors 1720 may be usable to trigger activation and/or deactivation of the code scanner

508. In another example, such additional sensors 1720 may be usable to detect when no physical ticket was generated, e.g., in an instance in which the retailer system 110 encountered an error or rejected a request slip, or the like. For instance, failure to detect a physical ticket may be indicative that the retailer system 110 encountered an error, in which case the computer system 1704 may be configured to generate an error indication, or the like.

In another example, the jumper ports 1714 may be usable to transition the controller 506 between a learn mode and a use mode. In some embodiments, the configuration of the jumper ports 1714 illustrated in FIG. 17 may correspond to a use mode of the controller 506. In the use mode, the controller 506 may be configured to operate different solenoid(s) 504 in response to different signals transmitted by the sensor(s) 502. For example, each sensor 502 may be configured to sense for one or more characteristics in different portions of a touch-screen 240. In response to detection of a first characteristic by a first sensor 502, the controller 506 may be configured to operate a first solenoid of a plurality of solenoids 504. In some instances, a solenoid 504 may be operated in response to signals from multiple sensors 502, and/or a signal from a sensor 502 may cause the controller 506 to operate multiple solenoids 504, e.g., simultaneously, in sequence, or the like. Any number or combination of sensor signals may cause the controller 506 to operate any number of solenoids 504, e.g., as determined by logic or instructions from the computer system 1704.

Figure 18:
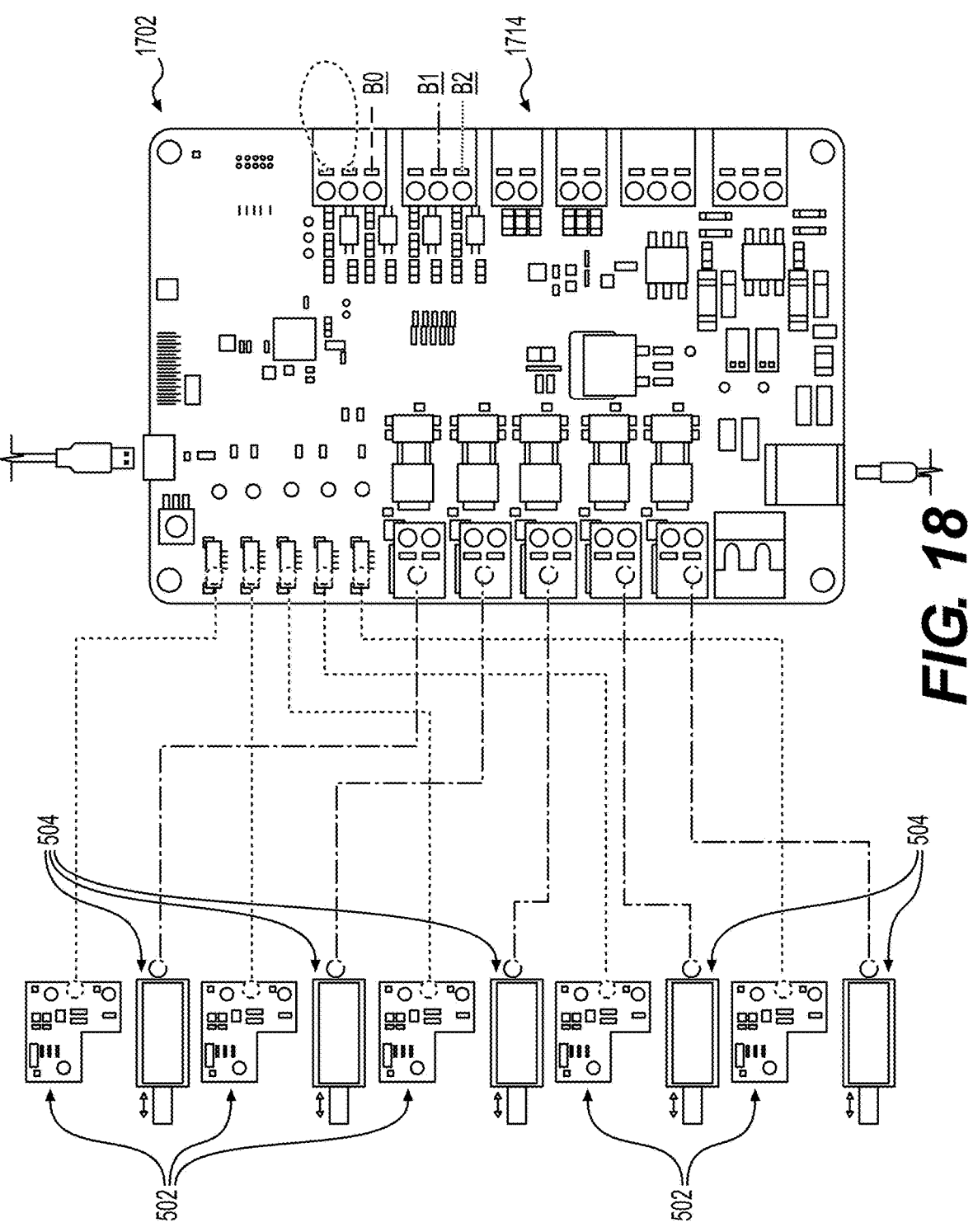
FIG. 18 depicts a schematic of another exemplary embodiment of a controller for an automated interaction system, according to the present disclosure.

FIG. 18 illustrates a configuration of the circuit board 1702 in the learn mode. In particular, two of the jumper ports 1714 are connected together to trigger the learning mode. In the learning mode, different sensor(s) 502 may be activated for learning by introducing pin connections B0, B1, and/or B2 to a further set of jumper ports. Table 1 below illustrates how each of five different sensors 502 may be activated for learning, in which a "0" denotes no pin connection and "1" denotes the presence of a pin connection.

TABLE 1

| Sensor Activation Selection Via Jumper Pin Connections | | | |
|---|---|---|---|
| Sensor | B0 | B1 | B2 |
| 1 | 1 | 0 | 0 |
| 2 | 0 | 1 | 0 |
| 3 | 0 | 0 | 1 |
| 4 | 1 | 1 | 0 |
| 5 | 0 | 1 | 1 |

When a sensor 502 is activated for learning, the signal generated by the sensor 502 may be associated with the presence of a particular characteristic. An exemplary learning operation is discussed in further detail below.

In the methods discussed below, various acts are described as performed or otherwise executed by a component of the computing environment 100 illustrated in FIG. 1, such as the retailer system 110, automated interaction system 140, or portion thereof. However, it should be understood that various components of the computing environment 100 may execute instructions or perform acts including the acts discussed below. Various operations may be performed via a processor or an actuator, for example. Further, it should be understood that various steps may be added, omitted, and/or rearranged in any suitable manner, in the following exemplary methods.

FIG. 19 illustrates a flow diagram of an exemplary learning operation method for a controller 506 of an automated interaction system 140, such as in the various examples discussed above. At step 1902, a first sensor 502 may be exposed to a stimulus. For example, a retailer system 110 may, at a certain point in generating a physical ticket in response to a request slip or other material, may require an interaction and generate an output indicative of the required or desired interaction. Such output may have a particular shape or color, which may be usable as the a characteristic to be sensed. Exposure may include using the actual output of the retailer system 110, and/or a simulation or analog thereof.

At step 1904, a learning mode of a controller 506 of an automated interaction system 140 may be triggered. For example, jumper ports 1 and 2 of jumper ports 1714 may be connected to trigger the learning mode. At step 1906, a first sensor 502 may be activated for learning. For example, referring to Table 1 above, a pin connection may be introduced to B0 at a first jumper port 3, with no connections at B1 or B2 at jumper ports 5 and 6 respectively, so as to activate the first sensor 502 for learning. At step 1908, the first sensor 502 may generate a signal responsive to the exposure to the characteristic. At step 1910, the generated signal may be associated with the characteristic. As a result, future generation of the signal by the first sensor 502 may be indicative of a presence of the characteristic. The association between the signal and the characteristic may be performed, for example, via the computer system 1704 of the controller 506, e.g., in conjunction with a user setting via the interface 1722.

At step 1912, the presence of the characteristic may be associated with operation of a first solenoid 504. The association between the presence of the characteristic and the operation of the solenoid 504 may be performed, for example, via the computer system 1704 of the controller 506, e.g., in conjunction with a user setting via the interface 1722. It should be understood that steps 1902, 1904, 1906, 1908, and 1910 may be repeated for any number of sensors. Additionally, it should be understood that, for step 1912, any combination of any number of characteristics may be associated with the operation of any number of solenoids, and that such operation may be simultaneous, sequential, or grouped, in order to fulfil the desired interaction of the retailer system 110.

FIG. 20 illustrates a flow diagram of an exemplary method of automating interaction with a touch-screen device according to the present disclosure. At step 2002, an automated interaction system 140 may be engaged with a retailer system 110. The retailer system 110 may be engaged with a device configured to feed the retailer system 110 with material, such as an automated feeder system. Engaging the automated interaction system 140 with the retailer system 110 may include, for example, affixing such components to a support plate 227, engaging arms 510 of a frame 500 of the automated interaction system 140 with the retailer system 110, adjusting one or more adjustment members 530 of the automated interaction system 140 to set an operating depth of one or more optical sensor(s) 502 or one or more solenoid(s) 504 of the automated interaction system 140, and/or moving a second portion 514 of the frame 500 to a first position so that the one or more optical sensor(s) 502 or one or more solenoid(s) 504 of the automated interaction system 140 are within operative range of a touch-screen 240 of the retailer system 110. In some embodiments, during, or after step 2002, the one or more optical sensor(s) 502 or one or more solenoid(s) 504 of the automated interaction system 140 may be positioned at desired location(s) on the frame 500, e.g., at locations corresponding to predetermined interactions of the retailer system 110, e.g., interactions known by a user setting up the automated interaction system 140 for use.

At step 2004, the retailer system 110 may receive material (e.g., physical material such as a request slip) configured to cause the retailer system 110 to generate a physical output. For example, in an exemplary use case involving a game of chance, a customer 145 may access an electronic application associated with the game of chance, e.g., via a customer device 105. Using an electronic application, the customer 145 may transmit and/or enter a request for one or more entries into the game of chance. The request may include, for example, an amount for a respective entry, a number of entries, an event to be associated with an entry, customer information, location information, authentication information, etc. The customer device 105, the customer 145 and/or the electronic application may submit the entered request to a provider server system 130, e.g., via an electronic network 125. The provider server system 130 may receive the request for one or more entries into the game of chance from the customer device 105, and may cause a physical request slip corresponding to the one or more entries to be conveyed and submitted to the retailer system 110. In various embodiments, the provider may employ a retailer 150, an automated feeder system 135, and/or an agent, e.g., a person, to convey and submit the request slip to the retailer system 110. In some embodiments, the printer system 133 and/or another system may be configured to automatically convey and submit the request slip to the retailer system 110.

At step 2006, the retailer system 110 may initiate a process to generate a physical output, e.g., a physical ticket for the game of chance based on the submitted physical request slip, such that the physical ticket corresponds to the one or more entries requested by the customer 145. For example, the retailer system 110 may transmit a request based on the received physical request slip to the provider server system 130. In response to receiving the request, the provider server system 130 may associate each of the one or more entries of the request with a respective wager in a predetermined set of wagers. The provider server system 130 may transmit data to the retailer system 110 configured to cause the retailer system 110 to output a physical ticket that includes information related to the one or more entries and/or the associated wagers.

At step 2008, the retailer system 110 may indicate a desired interaction by generating an output on a touch-screen 240. For example, further to the process for generating a physical output, the retailer system 110 may request an interaction prior to completion of the process, such as validation of the entry, or confirmation that the customer 145 is of a predetermined age or greater, for example.

At step 2010, at least one optical sensor 502 of the automated interaction system 140 may sense a predetermined characteristic at a first portion of the touch-screen 240 for the output generated by the retailer system 110, and generate a signal indicative of the sensing. At step 2012, a controller 506 of the automated interaction system 140 may receive the signal. At step 2014, in response to receiving the signal, the controller 506 may operate at least one solenoid 504 such that an end effector 906 of the solenoid 504 that is tactilely detectable by the touch-screen 240 tactilely engages with a second portion of the touch-screen 240. The first portion of the touch-screen 240 may be the same portion as the second portion of the touch-screen 240, or may be a different portion. Various combinations of sensor signals may be received, and various combinations of solenoids may be operated, as discussed above. The second portion may be positioned such that the engagement of the end effector 906 satisfies the desired interaction of the retailer system 110.

In some embodiments, the operation of the at least one solenoid 504 by the controller 506 may be in response to receiving an indication or instruction from the automated feeder system 135. In some embodiments, the controller 506 may transmit a message indicative of the operation of the at least one solenoid 540 to another device, e.g., the automated feeder system 135. Such integration and/or communication may facilitate such devices operating in concert with each other, and may reduce bottlenecks in the process and/or reduce a risk of jams or interferences between devices.

At step 2016, in response to the satisfaction of the interaction, e.g., the engagement of the end effector 906 with the second portion of the touch-screen 240, the retailer system 110 may generate the physical output.

Optionally, at step 2018, the automated interaction system 140 may scan information from the generated physical output, e.g., via a code scanner 508 mounted on the frame 500. In some embodiments, the controller 506 may transmit a message, e.g., to the automated feeder system 135, based on the scanning by the code scanner 508. The message may include, for example, an indication of a successful generation of the physical output, information included in the physical output, or the like. The message may be used, for example, to determine that the retailer system 110 is ready to receive additional material.

In some embodiments, the provider server system 130 may parse the captured information, e.g., via a text recognition algorithm, object recognition algorithm, or the like. Captured and/or parsed information may include information usable to uniquely identify the physical ticket, information indicative of the one or more wagers associated with the one or more entries of the customer's request, customer information, customer account information, and/or authentication information. The captured information and/or the parsed information may be transmitted to the provider server system 130.

In general, any process or operation discussed in this disclosure that is understood to be computer-implementable, such as the exemplary methods illustrated in FIGS. 19 and 20, may be performed by one or more processors of a computer system, such any of the systems or devices in the computing environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any other suitable type of processing unit.

A computer system according to the present disclosure, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 21:
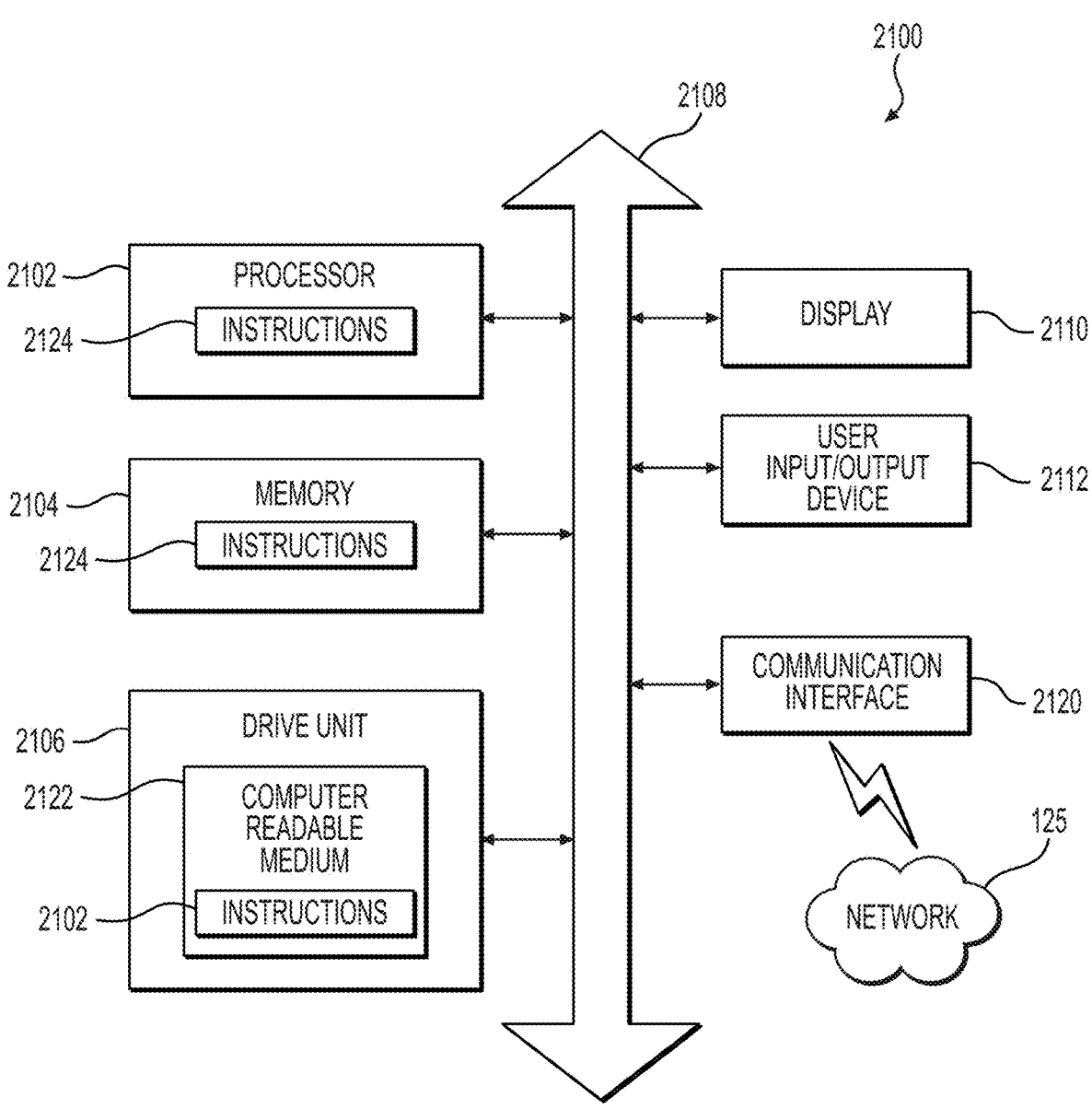
FIG. 21 depicts a functional block diagram of an exemplary computer, according to one or more embodiments.

FIG. 21 is a simplified functional block diagram of a computer 2100 that may be configured as a device for executing the methods of FIGS. 19 and 20, according to exemplary embodiments of the present disclosure. The computer 2100 may be configured as the provider server system 130, the automated feeder system 135, the automated interaction system 140, or the controller 506, or combinations thereof. Any of the systems herein may be an assembly of hardware including, for example, a data communication interface 2120 for packet data communication. The computer 2100 also may include a CPU 2102 in the form of one or more processors for executing program instructions. The computer 2100 may include a communication bus 2108 and a storage drive unit 2106 (such as ROM, HDD, SDD, etc.) that may store data on a computer readable medium 2122; additionally or alternatively the computer 2100 may receive programming and data via network communications. The computer 2100 may also have a memory 2104 (such as RAM) storing instructions 2124 for executing methods presented herein; additionally or alternatively the instructions 2124 may be stored temporarily or permanently within other modules of computer 2100 (e.g., processor 2102 and/or computer readable medium 2122). The computer 2100 also may include input and output ports of a user input/output device 2112 and/or a display 2110 to connect with the input/output device 2112 such as keyboards, mice, touchscreens, monitors, displays, etc. The various system functions may be implemented in a distributed fashion on a number of similar platforms, to distribute the processing load. Additionally or alternatively, the systems may be implemented by appropriate programming of one computer hardware platform.

Program aspects of the present disclosure may be described as "products" or "articles of manufacture," typically in the form of executable code and/or associated data that is carried on or otherwise embodied in a type of machine-readable medium. "Storage" type media include any or all of the tangible memory of the computers, processors, or associated modules thereof, such as various semiconductor memories, tape drives, and/or disk drives, which may provide non-transitory storage for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links or optical links, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects.

Furthermore, while some embodiments described herein include some but not other features included in other embodiments, combinations of features of different embodiments are meant to be within the scope of the invention, and form different embodiments, as would be understood by those skilled in the art.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure.

We claim:

1. A computer-implemented method, comprising:
receiving, at a server instance of an electronic application and from at least one client instance of the electronic application operating on a user device, at least one request for a physical media element;
causing a physical request slip corresponding to each request to be conveyed to one or more terminal systems;
monitoring, via at least one sensor of a respective automated interaction device operatively engaged with a screen of each of the one or more terminal systems, an operating state of each of the one or more terminal systems;
detecting, by at least one of the respective automated interaction devices and via the monitoring, that at least one terminal system is awaiting an input to the screen of the at least one terminal system; and
in response to the detecting, causing the respective automated interaction device to operate a solenoid operationally engaged with the at least one terminal system to autonomously provide the input awaited to the screen of the at least one terminal system.

2. The computer-implemented method of claim 1, wherein providing the input causes the at least one terminal system to proceed with generating the physical media element based on a corresponding physical request slip.

3. The computer-implemented method of claim 1, further comprising:
obtaining media data scanned from each physical media element generated by the one or more terminal systems.

4. The computer-implemented method of claim 3, further comprising:
at the server instance, generating an association between each physical media element and corresponding media data with a corresponding request.

5. The computer-implemented method of claim 4, further comprising:
transmitting, by the server instance, the media data to a provider system; and
receiving a validated position of the physical media elements from the provider system.

6. The computer-implemented method of claim 5, further comprising:
based on the generated association, causing the client instance of the electronic application operating on the user device to output the validated position corresponding to the request.

7. A computer-implemented method, comprising:
receiving, from an instance of an electronic application operating on a user device, a request for a physical media element;
causing a physical request element corresponding to the request to be conveyed to a terminal system;
detecting, via one or more optical sensors of an automated interaction device, that the terminal system is in a state awaiting input;
causing the automated interaction device to operate one or more actuators to mechanically interact with the terminal system and cause the terminal system to receive the awaited input;
obtaining physical media data scanned from a physical media element generated by the terminal system;
causing the instance of the electronic application operating on the user device to output a notification regarding the physical media data.

8. The computer-implemented method of claim 7, wherein causing the physical request element to be conveyed to the terminal system includes causing a printer to print the physical request element based on data included in the request.

9. The computer-implemented method of claim 7, wherein causing the physical request element to be conveyed to the terminal system includes operating an automatic feeder system that is operationally engaged with a physical input of the terminal system.

10. The computer-implemented method of claim 7, wherein obtaining the physical media data includes:
causing a scanner to generate a scan the physical media element generated by the terminal system; and
parsing the scan to determine the physical media data.

11. The computer-implemented method of claim 7, wherein:
the one or more actuators includes an end effector that is tactilely detectable by a touch screen of the terminal system; and
the mechanical interaction with the terminal system includes tactile engagement of the end effector with the touch screen.

12. The computer-implemented method of claim 7, further comprising:
generating an association between the physical media data and the request.

13. The computer-implemented method of claim 7, further comprising:
validating a position of the physical media element; and
causing the instance of the electronic application to output the validated position.

14. A system, comprising:
an automated interaction device that includes:
at least one actuator with an end effector that is tactilely detectable by a touch screen; and
at least one sensor configured to monitor a display of at least a portion of the touch screen; and a server that includes:

at least one memory storing instructions; and at least one processor operatively connected to the at least one memory and configured to execute the instructions to perform operations, including: 5 hosting a server instance of an electronic application:

receiving from a client instance of the electronic application, a request for one or more physical media elements;

causing conveyance of a physical request element to 10 a terminal system that includes the touch screen;

obtaining physical media data from a scan of the one or more physical media elements generated by the terminal system; and transmitting at least a portion of the physical media 15 data to the client instance of the electronic application;

wherein the automated interaction device is configured to operate the actuator so as to interact with the touch screen via the end effector in response to 20 detecting, via the monitoring, that the terminal system is awaiting input.

15. The system of claim 14, further comprising:

a printer, wherein the operations further include causing the printer to generate the physical request element based on data included in the request.

16. The system of claim 14, further comprising:

a scanner, wherein the obtaining of the physical media data from a scan of the one or more physical media elements generated by the terminal system is performed via the scanner.

17. The system of claim 14, wherein the operations further include:

associating the physical media data with the request;

transmitting at least a portion of the physical media data to a provider system;

receiving validated position data associated with the request from the provider system; and transmitting the validated position data to the client instance of the electronic application.

18. The system of claim 14, wherein the automated interaction device is removably affixed to the terminal system.

19. The system of claim 14, further comprising an automated feeder system operable to autonomously convey the physical request element to a mechanical input of the terminal system.

20. The system of claim 19, wherein the one or more sensors of the automated interaction device are activated in response to a signal from the automated feeder system.

* * * * *